US012244074B2

(12) United States Patent
Zhao et al.

(10) Patent No.: US 12,244,074 B2
(45) Date of Patent: Mar. 4, 2025

(54) COMMUNICATION DEVICE HAVING A CONFIGURABLE HOUSING ASSEMBLY WITH MULTIPLE ANTENNAS

(71) Applicant: MOTOROLA MOBILITY LLC, Chicago, IL (US)

(72) Inventors: Junsheng Zhao, Vernon Hills, IL (US); Mohammed R. Abdul-Gaffoor, Palatine, IL (US); Md Faisal Abedin, Lisle, IL (US); Md Rashidul Islam, Glen Ellyn, IL (US); Kasra Ghaemi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 451 days.

(21) Appl. No.: 17/170,246

(22) Filed: Feb. 8, 2021

(65) Prior Publication Data

US 2022/0255216 A1 Aug. 11, 2022

(51) Int. Cl.
*H01Q 3/06* (2006.01)
*H01Q 1/24* (2006.01)
*H01Q 21/28* (2006.01)

(52) U.S. Cl.
CPC ............... *H01Q 3/06* (2013.01); *H01Q 1/243* (2013.01); *H01Q 21/28* (2013.01)

(58) Field of Classification Search
CPC ........... H01Q 3/06; H01Q 1/243; H01Q 21/28
See application file for complete search history.

(56) References Cited

U.S. PATENT DOCUMENTS 4,992,799 A * 2/1991 Garay ...................... H01Q 7/00 343/866
7,031,744 B2 * 4/2006 Kuriyama ............ H04B 7/0608 455/575.1

(Continued)

FOREIGN PATENT DOCUMENTS

EP 3672210 A1 6/2020

OTHER PUBLICATIONS

Intellectual Property Office, Application No. GB2201212.4, Search Report, May 19, 2022.

*Primary Examiner* — Hai V Tran
*Assistant Examiner* — Bamidele A Immanuel
(74) *Attorney, Agent, or Firm* — Isidore PLLC

(57) ABSTRACT

A communication device, method and computer program product enable transceivers to communicate via antennas supported by a configurable housing assembly. First and second housing portions are connected at respective proximal sides for relative movement between an open position and a closed position about a lateral axis. First and second antenna elements of a first antenna array each have an elongated shape and are configured to communicate in radio frequency (RF) communication band(s). The first and the second antenna elements are supported respectively by the first and the second housing portions. The first antenna element is proximate to and substantially aligned in parallel with the second antenna element when the housing assembly is in the closed position and separated when the housing assembly is in the open position. A first antenna feed/source network eliminates array cancellations between the first and the second antenna elements when the housing assembly is in the closed position.

20 Claims, 17 Drawing Sheets

(56) References Cited

U.S. PATENT DOCUMENTS

| | | | | |
|---|---|---|---|---|
| 7,444,175 | B2 | 10/2008 | Ito et al. | |
| 8,849,217 | B2 | 9/2014 | Rousu et al. | |
| 9,391,762 | B2 | 7/2016 | Rousu | |
| 9,906,260 | B2 * | 2/2018 | Ramachandran | H04B 1/44 |
| 9,948,002 | B2 * | 4/2018 | Heikura | H01Q 1/243 |
| 9,973,228 | B2 * | 5/2018 | Heikura | H01Q 5/378 |
| 10,554,243 | B2 | 2/2020 | Bai | |
| 10,587,329 | B2 | 3/2020 | Maldonado et al. | |
| 10,972,145 | B1 | 4/2021 | Klomsdorf et al. | |
| 11,115,510 | B1 * | 9/2021 | Abdul-Gaffoor | H01Q 21/08 |
| 11,115,511 | B1 | 9/2021 | Ghaemi et al. | |
| 2003/0228891 | A1 * | 12/2003 | Kobayashi | H01Q 1/242 455/575.1 |
| 2005/0143151 | A1 * | 6/2005 | Ito | H04B 7/0871 455/575.5 |
| 2007/0161419 | A1 * | 7/2007 | Dakeya | H01Q 1/084 455/575.3 |
| 2008/0068271 | A1 * | 3/2008 | Iwai | H01Q 1/245 343/702 |
| 2009/0233657 | A1 * | 9/2009 | Ogawa | H01Q 9/16 455/575.3 |
| 2010/0184493 | A1 | 7/2010 | Lin et al. | |
| 2011/0014879 | A1 | 1/2011 | Alberth et al. | |
| 2011/0267998 | A1 * | 11/2011 | Meharry | H01Q 3/24 343/876 |
| 2012/0196651 | A1 * | 8/2012 | Nakamura | H04B 7/0834 455/566 |
| 2014/0240178 | A1 * | 8/2014 | Chun | H01Q 21/28 343/702 |
| 2016/0308279 | A1 * | 10/2016 | Athley | H01Q 1/246 |
| 2017/0229760 | A1 * | 8/2017 | Karilainen | H01Q 1/2266 |
| 2017/0346164 | A1 * | 11/2017 | Kim | H04M 1/0266 |
| 2018/0366812 | A1 * | 12/2018 | Kim | H01Q 1/44 |
| 2018/0366813 | A1 * | 12/2018 | Kim | H01Q 9/04 |
| 2019/0103656 | A1 * | 4/2019 | Shi | G06F 1/1683 |
| 2020/0076062 | A1 * | 3/2020 | Lee | H01Q 5/307 |
| 2020/0076488 | A1 | 3/2020 | Brunel | |
| 2020/0194904 | A1 * | 6/2020 | Huh | H01Q 21/065 |
| 2020/0195336 | A1 * | 6/2020 | Raghavan | H04B 7/0874 |
| 2020/0245481 | A1 * | 7/2020 | Yoon | G06F 1/1698 |
| 2020/0264659 | A1 * | 8/2020 | Kim | G06F 3/0482 |
| 2020/0265803 | A1 * | 8/2020 | Lee | G06F 1/1647 |
| 2020/0267847 | A1 * | 8/2020 | Lee | H04M 1/0277 |
| 2020/0304185 | A1 * | 9/2020 | Tsai | H04B 7/0802 |
| 2020/0333836 | A1 * | 10/2020 | Kim | G06F 3/033 |
| 2020/0356143 | A1 * | 11/2020 | Oh | G06F 1/203 |
| 2021/0037123 | A1 * | 2/2021 | Kim | H04M 1/0218 |
| 2021/0160356 | A1 * | 5/2021 | Woo | H04M 1/0216 |
| 2021/0328329 | A1 * | 10/2021 | Kim | H04M 1/0214 |
| 2022/0066724 | A1 * | 3/2022 | Moon | G06F 3/01 |

* cited by examiner

COMMUNICATION DEVICE HAVING A CONFIGURABLE HOUSING ASSEMBLY WITH MULTIPLE ANTENNAS

TECHNICAL FIELD

The present disclosure relates generally to communication devices having multiple antennas that support simultaneous communication channels, and more particularly to communication devices having multiple antennas that support simultaneous communication channels within a configurable housing assembly adjustable between an open and a closed position.

DESCRIPTION OF THE RELATED ART

Communication devices, such as smartphones, incorporate a number of antennas to support multiple frequency bands assigned to various types of communication networks. Generally-known communication devices having a flip form factor can have degraded antenna performance in certain RF bands when a configurable housing assembly of the communication device is folded or closed. During folding or closing, components in one movable portion of the communication device are brought close to components in the other portion of the communication device, changing antenna performance for certain antennas or antenna arrays. Conventionally, communication devices having a "candy bar" form factor that do not fold or close have an antenna architecture that spaces antennas around a periphery of a unitary housing. Communication device having a flip form factor ("flip phone") are generally smaller with insufficient places to put antennas for antenna isolation when the device is closed. The flip phones thus lose functionality for simultaneous communication by multiple transceivers.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. As an example, the dimensions of some of the elements are exaggerated relative to other elements. Embodiments incorporating teachings of the present disclosure are shown and described with respect to the figures presented herein, in which.

DETAILED DESCRIPTION

Figure 1:
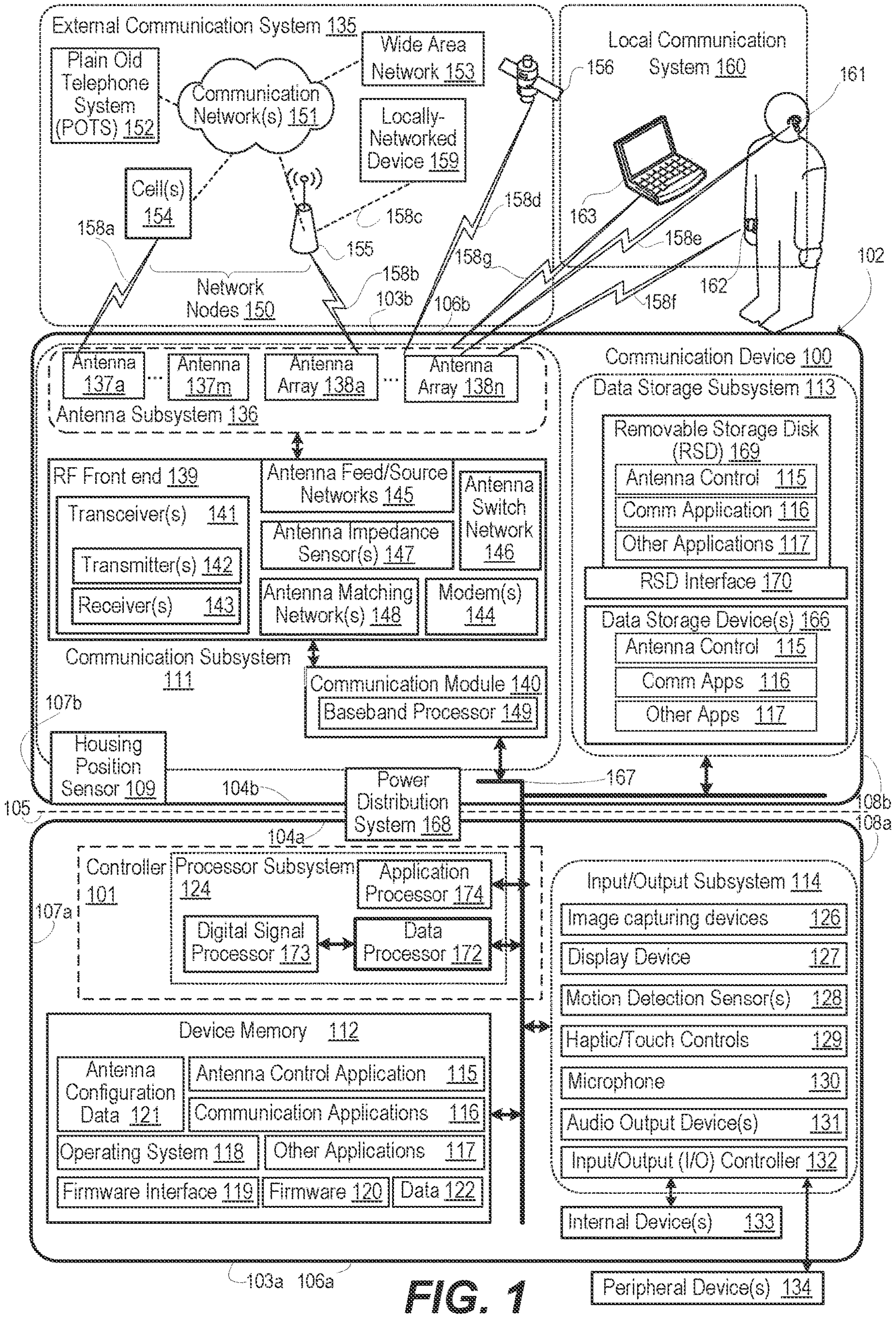
FIG. 1 depicts a functional block diagram of a communication device having multiple antennas operating in a communication environment and within which the features of the present disclosure are advantageously implemented, according to one or more embodiments.

According to aspects of the present disclosure, a communication device, a computer program product, and a method enable multiple transceivers to communicate via multiple antennas supported by a configurable housing assembly. The communication device includes first and second housing portions, connected at respective proximal sides for relative movement between an open position and a closed position about a lateral axis. First and second antenna elements of a first antenna array are supported respectively by the first and the second housing portions. Each of the first and the second antenna elements has an elongated shape and is configured to communicate in at least a radio frequency (RF) low band. The first antenna element is proximate to and substantially aligned in parallel with the second antenna element when the housing assembly is in the closed position. The first antenna element is separated from the second antenna element when the housing assembly is in the open position. A first antenna feed/source network that is communicatively coupled to the first and the second antenna elements eliminates array cancellations between the first and the second antenna elements when the housing assembly is in the closed position.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. As an example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. As an example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, which is managed by controller 101, in an operating environment and within which the features of the present disclosure are advantageously implemented. According to one aspect, communication device 100 includes configurable housing assembly 102 having first and second housing portions 103*a*-103*b* that are connected at respective first and second proximal sides 104*a*-104*b* enabling relative movement of the housing portions about lateral axis 105 between an open position and a closed position. Each of first and the second housing portions 103*a*-103*b* have respective distal side 106*a*-106*b* opposite to respective proximal side 104*a*-104*b*. First lateral side 107*a* and second lateral side 108*a* extend between proximal side 104*a* and distal side 106*a* of first housing portion 103*a*. First lateral side 107*b* and second lateral side 108*b* extend between proximal side 104*b* and distal side 106*b* of second housing portion 103*b*. Controller 101 is communicatively coupled to housing position sensor 109 that detects when housing assembly 102 is in: (i) a closed position; and (ii) a partially open position or fully open position. Controller 101 configures communication subsystem 111 based at least in part on the position of housing assembly 102. Housing position sensor 109 can be one of: (i) a two-position binary switch which detects the closed position and any other position considered a partially open position (i.e., not a closed position); (ii) a multiple position switch or discrete values; or (iii) a continuous range sensor. With each implementation, housing position sensor 109 detects the partially open position based on the two housing portions being a predetermined distance or number of degrees apart from each other (e.g., at 30° or 45°). The distance or number of degrees can be empirically determined to correspond with when the antennas are sufficiently apart from each other to not cause antenna-to-antenna transmission interference.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring again to the specific component makeup and the associated functionality of communication device 100. In one or more embodiments, communication device 100 includes device memory 112, communication subsystem 111, data storage subsystem 113, and input/output (I/O) subsystem 114. Device memory 112 and each subsystem (111, 113, and 114) are managed by controller 101. Device memory 112 includes program code and applications such as antenna control application 115, communication applications 116, and other application(s) 117 that use communication services. Device memory 112 further includes operating system (OS) 118, firmware interface 119, such as basic input/output system (BIOS) or Uniform Extensible Firmware Interface (UEFI), and firmware 120. Device memory 112 includes antenna configuration data 121 or other computer data 122 used by antenna control application 115. As an example, antenna configuration data 121 can include antenna assignments to a particular transceiver communication channel based on operating contexts. As an example, context can be MIMO antenna control for increased antenna gain. As another example, the context can be supporting execution of one or more applications. Particular applications can have particular rates of transmitting and receiving data with specific data latency requirements that dictate particular prioritization of communication connections. As an additional example, context can be based at least in part on power consumption and device thermal management that limit communication channels.

Processor subsystem 124 of controller 101 executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of antenna control application 115 to configure communication subsystem 111.

I/O subsystem 114 includes image capturing device(s) 126. I/O subsystem 114 includes user interface devices such as display device 127, motion detection sensors 128, touch/haptic controls 129, microphone 130, and audio output device(s) 131. I/O subsystem 114 also includes I/O controller 132. In one or more embodiments, motion detection sensors 128 can detect an orientation and movement of the communication device 100 that indicates that the communication device 100 should activate display device 127 or should vertically reorient visual content presented on display device 127. In one or more embodiments, motion detection sensors 128 are used for functions other than user inputs, such as detecting an impending ground impact. I/O controller 132 connects to internal devices 133, which are internal to housing assembly 102 and to peripheral devices 134, such as external speakers, which are external to housing assembly 102 of communication device 100. Examples of internal devices 133 are computing, storage, communication, or sensing components depicted within housing assembly 102. I/O controller 132 supports the necessary configuration of connectors, electrical power, communication protocols, and data buffering to act as an interface to internal devices 133 and peripheral devices 134 to other components of communication device 100 that use a different configuration for inputs and outputs.

Communication subsystem 111 of communication device 100 enables wireless communication with external communication system 135. Communication subsystem 111 includes antenna subsystem 136 having lower band antennas **137*a*-137*m* and higher band antenna array modules 138*a*-138*n* that can be attached in/at different portions of housing assembly 102. Communication subsystem 111 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 111 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137*a*-137*m*, 138*a*-138*n*) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137*a*-137*m* to tune impedances respectively of lower band antennas 137*a*-137*m* to match impedances of transceivers 141. Antenna matching network(s) 148 can also be used to detune the impedance of lower band antennas 137*a*-137*m* to not match the impedance of transceivers 141** to electromagnetically isolate a particular antenna.

In one or more embodiments, controller 101, via communication subsystem 111, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs.

In one or more embodiments, network nodes 150 can be access node(s) 155 that support wireless OTA communication. Communication subsystem 111 can receive OTA communication from location services such as provided by global positioning system (GPS) satellites 156. Communication subsystem 111 communicates via OTA communication channel(s) 158*a* with cells 154. Communication subsystem 111 communicates via wireless communication channel(s) 158*b* with access node 155. In one or more particular embodiments, access node 155 supports communication using one or more IEEE 802.11 wireless local area network (WLAN) protocols. In one or more particular embodiments, communication subsystem 111 communicates with one or more locally networked devices 159 via wired or wireless link 158*c* provided by access node 155. Communication subsystem 111 receives downlink broadcast channel(s) 158*d* from GPS satellites 156 to obtain geospatial location information.

In one or more embodiments, controller 101, via communication subsystem 111, performs multiple types of OTA communication with local communication system 160. In one or more embodiments, local communication system 160 includes wireless headset 161 and smart watch 162 that are coupled to communication device 100 to form a personal access network (PAN). Communication subsystem 111 communicates via low power wireless communication channel(s) 158*e* with headset 161. Communication subsystem 111 communicates via second low power wireless communication channel(s) 158*f*, such as Bluetooth, with smart watch 162. In one or more particular embodiments, communication subsystem 111 communicates with other communication device(s) 163 via wireless link 158*g* to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. As an example, data storage subsystem 113 can provide a selection of program code and applications such as antenna control application 115, location service applications 116, and other application(s) 117 that use communication services. These applications can be loaded into device memory 112 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as antenna control application 115 and other applications 117. When executed by controller 101, the program code causes or configures communication device 100 to provide the multi-transceiver operational functionality using a configurable housing assembly described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. Controller 101 can include one or more application processor(s) 174 to monitor sensors or controls such as housing position sensor 109 and antenna switch network 146. In one or embodiments that are not depicted, controller 101 can further include distributed processing and control components that are peripheral or remote to housing assembly 102 or grouped with other components, such as I/O subsystem 114. Data processor 172 is communicatively coupled, via system interlink 167, to device memory 112. In one or more embodiments, controller 101 of communication device 100 is communicatively coupled via system interlink 167 to communication subsystem 111, data storage subsystem 113, and input/output subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments. Interlink 167 communicatively connects components in first housing portion 103*a* to components in second housing portion 103*b*. Power distribution subsystem 168 provides electrical power to components in first housing portion 103*a* and components in second housing portion 103*b*.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. As an example, communication device 100 may use special purpose hardware, dedicated processors, general purpose computers, microprocessor-based computers, micro-controllers, optical computers, analog computers, dedicated processors and/or dedicated hard-wired logic.

Figure 2A:
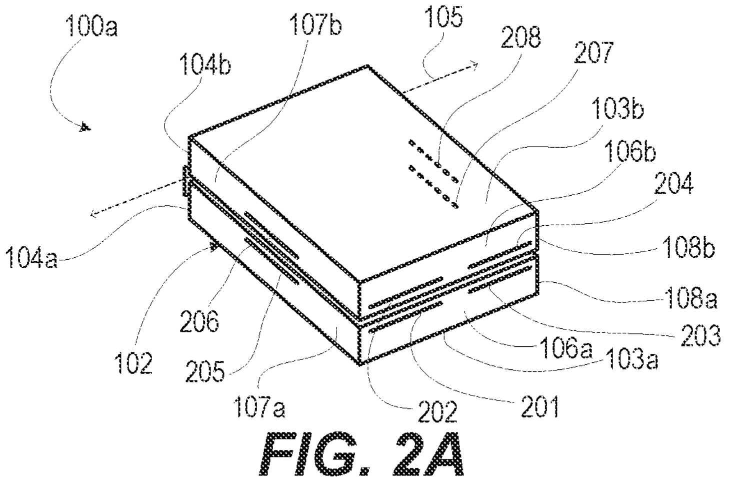
FIG. 2A depicts a three-dimensional view of an example communication device having a configurable housing assembly, presented in a closed position, according to one or more embodiments.
Figure 2B:
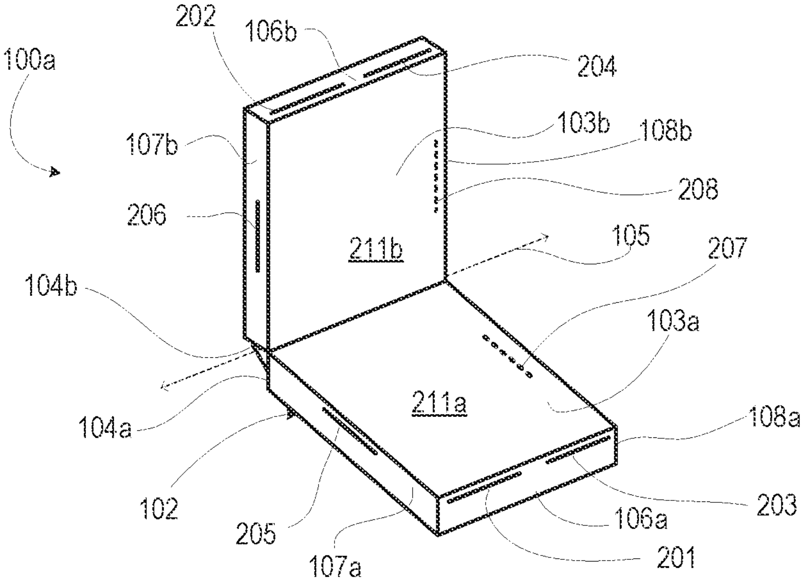
FIG. 2B depicts a three-dimensional view of the example communication device of FIG. 2A with the configurable housing assembly in a partially open position, according to one or more embodiments.
Figure 2C:
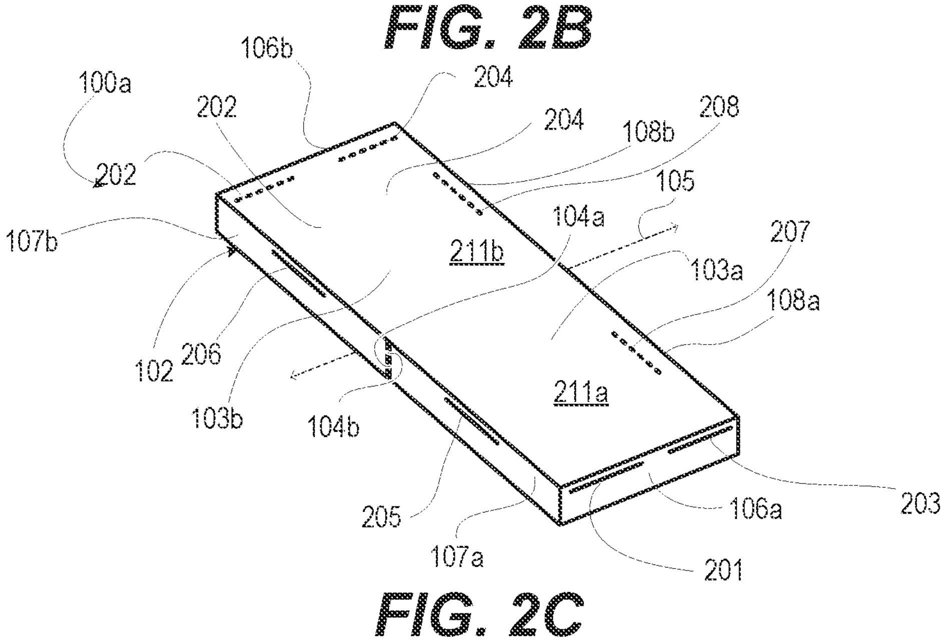
FIG. 2C depicts a three-dimensional view of the example communication device of FIG. 2A with the configurable housing assembly in a fully open position, according to one or more embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100*a* in place of 100). FIG. 2A depicts a three-dimensional view of an example communication device 100*a* having housing assembly 102 configured in a closed position. Communication device 100*a* can have similar or identical components and functionality of communication device 100 (FIG. 1). FIG. 2B depicts a three-dimensional view of example communication device 100*a* having housing assembly 102 configured in a partially open position. Housing position sensor 109 (FIG. 1) can detect a particular amount of pivoting from the closed position to the partially open position that is sufficient for a change in an operational characteristic of communication device 100*a*. As an example, the partially open position can be sufficient for viewing display device 127 (FIG. 1), prompting controller 101 (FIG. 1) to activate display device 127 (FIG. 1). For another example, the partially open position can be sufficient for two or more antennas that are respectively on first and second housing portions 103*a*-103*b* to sufficiently separated for independent operation without impairing antenna efficiency. The partially open position can be substantially the same as the fully open position with regard to antenna operation. FIG. 2C depicts a three-dimensional view of example communication device 100*a* having housing assembly 102 configured in a fully open position. In FIGS. 2A-2C, housing assembly 102 of communication device 100*a* is configurable by having first and second housing portions 103*a*-103*b* that are connected at respective first and second proximal sides 104*a*-104*b* for relative movement about lateral axis 105 between an open position and a closed position. In one embodiment, first housing portion 103*a* is a base housing, second housing portion 103*b* is a flip housing, first lateral sides 107*a*-107*b* are on the left, and second lateral sides 108*a*-108*b* are on the right.

According to one aspect, housing assembly 102 includes a plurality of possible antenna mounting locations, illustrated as antenna mounting locations 201-208. First antenna mounting location 201 is a left section of distal side 106*a* of first housing portion 103*a*. Second antenna mounting location 202 is a left section of distal side 106*b* of second housing portion 103*b*. Third antenna mounting location 203 is a right section of distal side 106*a* of first housing portion 103*a*. Fourth antenna mounting location 204 is a right section of distal side 106*b* of second housing portion 103*b*. Fifth antenna mounting location 205 is on left lateral side 107*a* of first housing portion 103*a*. Sixth antenna mounting location 206 is on left lateral side 107*b* of second housing portion 103*b*. Seventh antenna mounting location 207 is on right lateral side 108*a* of first housing portion 103*a*. Eighth antenna mounting location 208 on right lateral side 108*b* of second housing portion 103*b*. While housing assembly 102 is in the closed position of FIG. 2A, specific pairs of antenna mounting locations 201-208 are aligned proximate to each other across the base and flip housing. These aligned pairs include: (i) first and second antenna mounting locations 201-202; (ii) third and fourth antenna mounting locations 203-204; (iii) fifth and sixth antenna mounting locations 205-206; and (iv) seventh and eight antenna mounting locations 207-208. The close proximity impairs antenna efficiency.

At a partially open position of housing assembly 102 in FIG. 2B, separation between first and second housing portions 103*a*-103*b* is sufficient for viewing front surfaces 211*a*-211*b* respectively of first and second housing portions 103*a*-103*b*. At a partially open position of housing assembly 102 in FIG. 2B, separation between paired antenna mounting locations 201-208 is sufficient for antenna performance in low bands that is substantially the same as housing assembly 102 being in the fully open position of FIG. 2C. The at least partially open position of housing assembly 102 can be one or more positions greater than 0° and less than 180° defined as pivot angles between first and second housing portions 103*a*-103*b*. As an example, the defined pivot angles can be based on one or more considerations such as: (i) capabilities of housing position sensor 109 (FIG. 1); (ii) mechanically available positions of housing position 102; (iii) usability of user interface components; and (iv) spatial coverage of antennas 137*a*-137*d* as a function of pivot angle. As one example, housing assembly 102 can have a pivot mechanism that is stable in three positions: (i) fully closed; (ii) open 90°; and (iii) fully open. At least partially open position can be based on a pivot position of at least 45° that corresponds to activating a front display device in preparation for viewing at 90° or fully open. As another example, certain pivot positions affect an ability to communicate in certain spatial directions. Detecting one or more positions of housing 102 can be used to select antennas 137*a*-137*d* for spatial diversity. Two or more at least partially open positions of housing assembly 102 can be detected for triggering changes in an operational mode of communication device 100*a*, such as changing a use of display devices 127 (FIG. 1). For clarity, eight (8) positions 201-208 for receiving eight (8) antennas 137*a*-137*h* (FIG. 1) are provided. In one or more embodiments, fewer or more antenna positions can be provided for use with fewer or more antennas. In FIG. 2C, housing assembly 102 is in a fully open position with substantially 180° rotation between first and second housing portions 103*a*-103*b*.

Figure 3A:
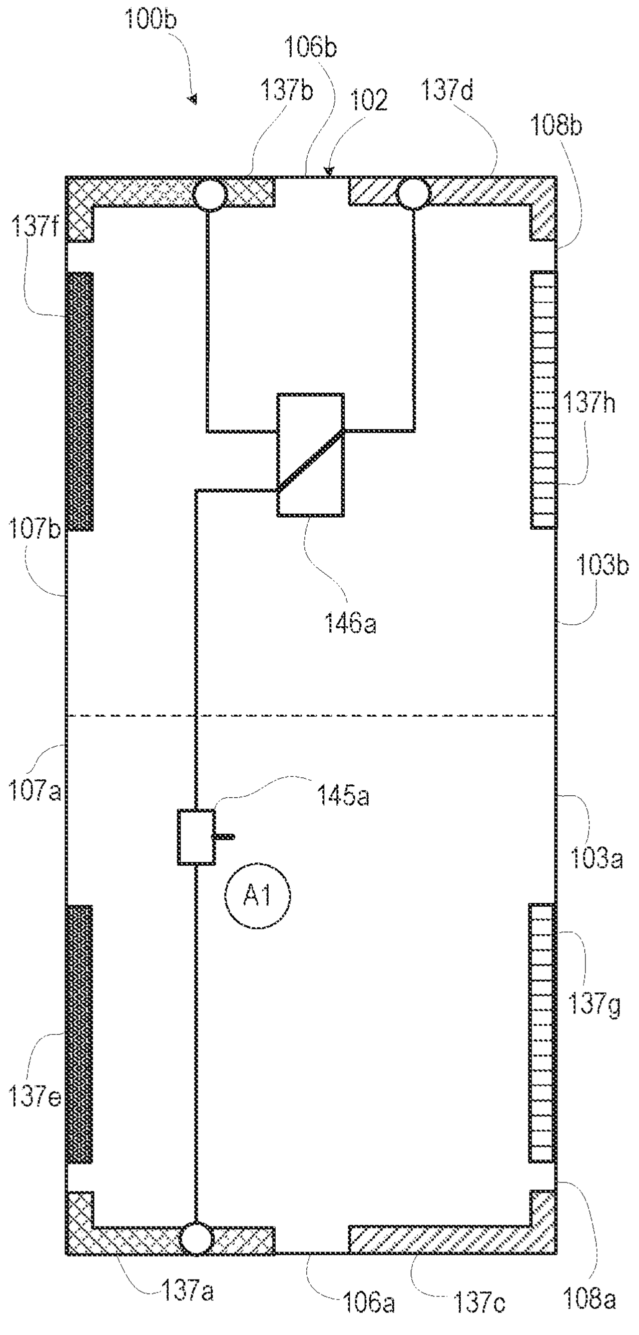
FIG. 3A depicts a front view of an example communication device with one antenna feed/source network switched in response to the housing assembly being in the open position, according to one or more embodiments.

FIG. 3A depicts a front diagram of example communication device 100*b* having one antenna feed/source network that is in a switch state that corresponds to the housing assembly being in one of the closed position and the open position. Communication device 100*b* can have similar or identical components and functionality of communication device 100 (FIG. 1). In one or more embodiments, communication device 100*b* includes antennas 137*a*-137*d* within first housing portion 100*a* and antennas 137*e*-137*h* within second housing portion 100. When housing assembly 102 is in the close position, first lateral sides 170*a*-107*b*, distal sides 106*a*-106*b*, and second lateral sides 108*a*-108*b* of first and second housing portions 103*a*-103*b* respectively align. Antennas 137*a*, 137*c*, 137*e*, and 137*g* substantially align in parallel respectively with antenna 137*b*, 137*d*, 137*f*, and 137*h*. First antenna 137*a* is positioned at a first lateral section of distal side 106*a* of first housing portion 103*a*. Second antenna 137*b* is positioned at a first lateral section of distal side 106*b* of second housing portion 103*b*. Third antenna 137*c* is positioned at a second lateral section of distal side 106*a* of first housing portion 103*a*. Fourth antenna 137*d* is positioned at a second lateral section of distal side 106*b* of second housing portion 103*b*. Fifth antenna 137*e* is positioned at first lateral side 107*a* of first housing portion 103*a*. Sixth antenna 137*f* is positioned at first lateral side 107*b* of second housing portion 103*b*. Seventh antenna 137*g* is positioned at second lateral side 108*a* of first housing portion 103*a*. Eighth antenna 137*h* is positioned at second lateral side 108*b* of second housing portion 103*b*. First antenna feed/source network(s) 145*a* is communicatively connected to first antenna 137*a*. First antenna switch 146*a* communicatively connects first antenna feed/source network(s) 145*a* to one of second and fourth antennas 137*b*-137*d*. In one or more embodiments, first antenna switch 146*a* is a one pole two throw switch that is configured to connect first antenna feed/source network 145*a* to third antenna 137*c* while housing assembly 102 is in the open position. First and fourth antennas 137*a*, 137*d* provide increased physical separation for spatial diversity over first and second antennas 137*a*-137*b*. Second antenna 137*b* is available for being used separately.

Figure 3B:
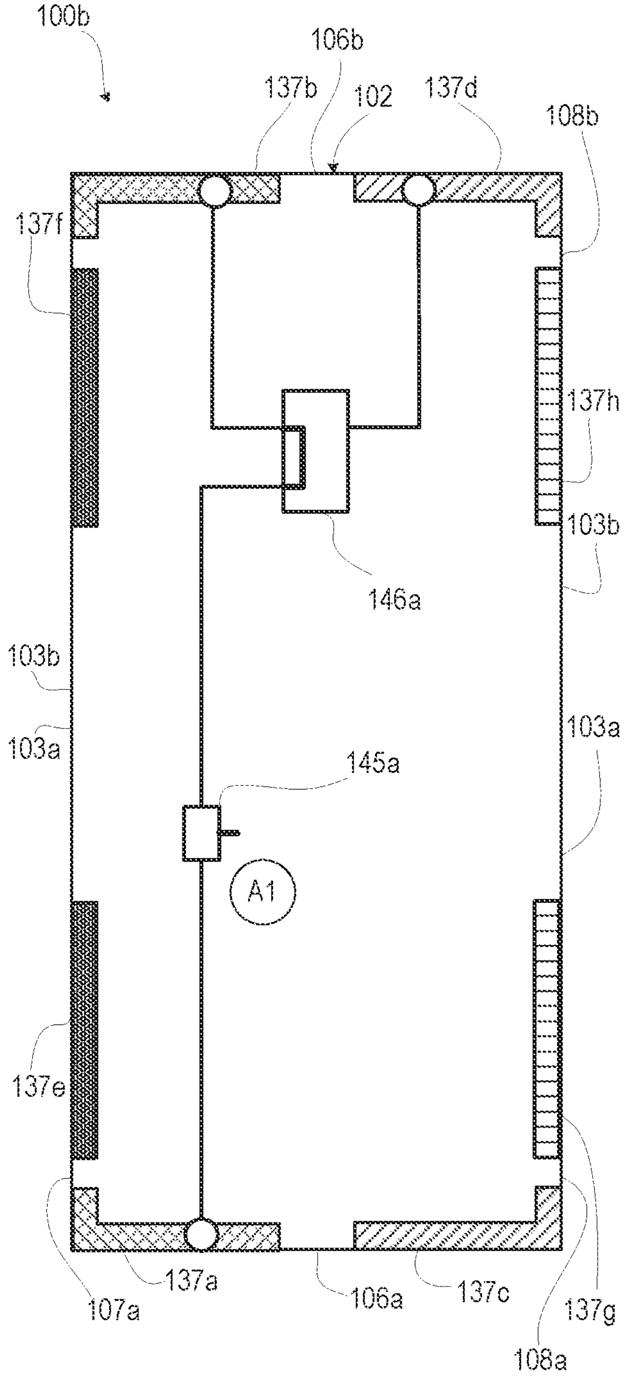
FIG. 3B depicts a different front view of the example communication device of FIG. 3A with the antenna feed/source network switched, according to one or more embodiments.
Figure 3C:
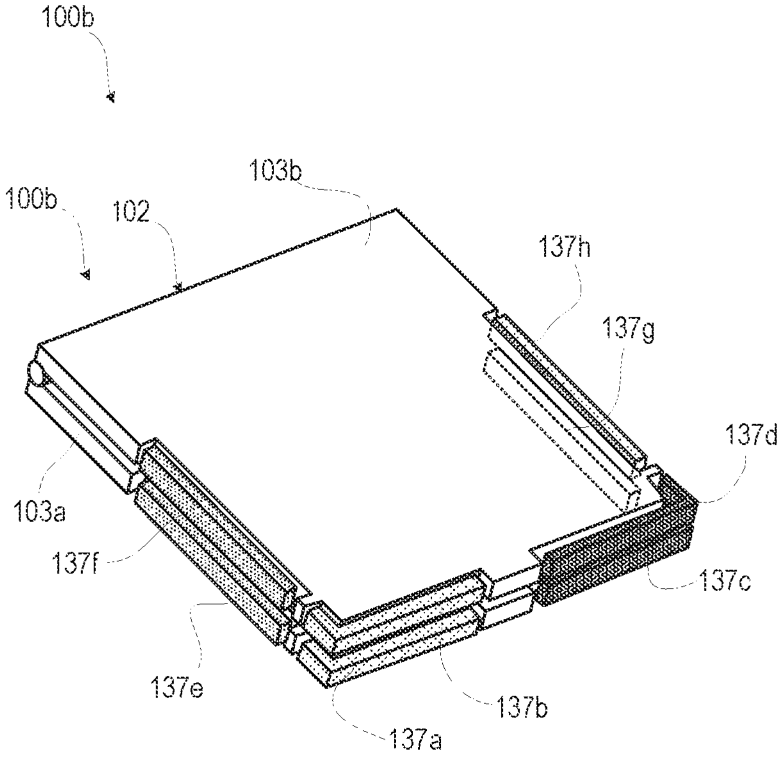
FIG. 3C depicts a three-dimensional view of the example communication device of FIG. 3B with the housing assembly in the closed position, according to one or more embodiments.

FIG. 3B depicts a front diagram of example communication device 100*b* with first antenna feed/source network 145*a* that is switched by first antenna switch 146*a* to second antenna 137*b*. FIG. 3C depicts a three-dimensional view of example communication device 100*b* while housing assembly 102 is in the closed position. The two antennas in each of the different pairs of antennas 137*a*-137*h* are too close to each other for independent communication. Also, while housing assembly 102 is in the closed position, first and second antennas 137*a*-137*b* are proximate to and substantially aligned with each other. Fourth antenna 137*d* is available for being used separately. In response to housing assembly 102 is in the closed position, first antenna feed/source network 145*a* is switched by first antenna switch 146*a* to second antenna 137*b* as depicted in FIG. 3B.

Figure 4A:
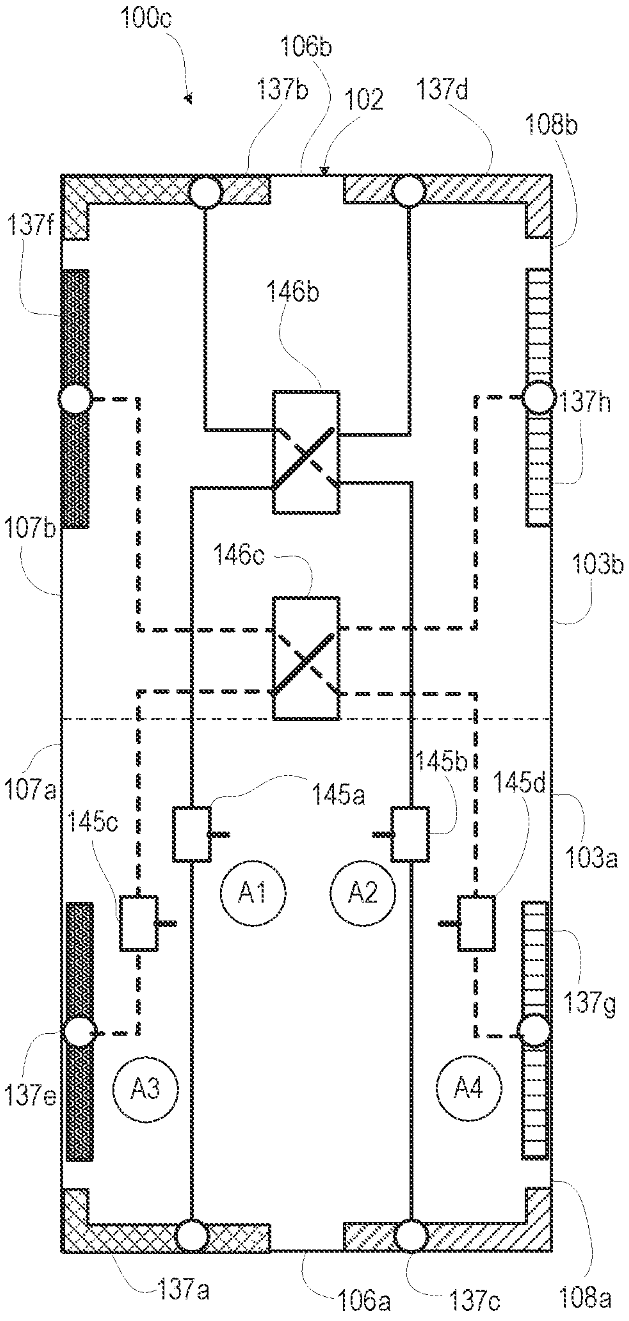
FIG. 4A depicts a front view of an example communication device configured with four antenna feed/source networks that are switched in response to the housing assembly being in the open position, according to one or more embodiments.

FIG. 4A depicts a front diagram of example communication device 100*c* with four antenna feed/source networks switched by first antenna switch 146*b* in response to the housing assembly 102 being in the open position. Communication device 100*c* can have similar or identical components and functionality of communication device 100 (FIG. 1). Antennas 137*a*-137*h* are positioned identically or similarly as described above for communication device 100*b* (FIGS. 3A-3B). In addition to first antenna feed/source network 145*a*, communication device 100*c* includes second, third, and fourth antenna feed/source networks 145*b*-145*d*. First and second antenna switches 146*b*-146*c* are two pole two throw switches. Second antenna feed/source network 145*b* is communicatively connected to third antenna 137*c*. First antenna switch 146*b* further communicatively connects second antenna feed/source network 145*b* to one of second and fourth antennas 137*b*, 137*d*. First antenna feed/source network(s) 145*a* is communicatively connected to first antenna 137*a*. First antenna switch 146*b* communicatively connects first antenna feed/source network(s) 145*a* to one of second and fourth antennas 137*b*, 137*d*. First antenna switch 146*b* is further configured to connect second antenna feed/source network(s) 145*b* to second antenna 137*b* while housing assembly 102 is in the open position. While housing assembly 102 is in the open position, first and fourth antennas 137*a*, 137*d* are on opposite corners of communication device 100*c*. Similarly, second and third antennas 137*b*-137*c* are on the other opposite corners of communication device 100*c*. The greatest possible physical separation of each combination ($1^{st}$ and $4^{th}$; and $2^{nd}$ and $3^{rd}$) provides the highest possible spatial diversity.

Third antenna feed/source network 145*c* is communicatively connected to fifth antenna 137*e*. Fourth antenna feed/source network 145*d* is communicatively connected to seventh antenna 137*g*. To increase spatial diversity while housing assembly 102 is in the open position, second antenna switch 146*c* communicatively connects third antenna feed/source network 145*c* to eighth antenna 137*h*. To increase spatial diversity while housing assembly 102 is in the open position, second antenna switch 146*c* is further configured to connect fourth antenna feed/source network(s) 145*d* to sixth antenna 137*f*. While the housing assembly 102 is in the open position, antenna feed/source networks 145*a*-145*d* create relative feed phases at the communicatively-connected pair of antennas 137*a*-137*h* at specific values for best performance. As an example, first, second, third, and fourth antenna feed/source networks 145*a*-145*d* create an off-phase (180°) difference at ULB/LB RF communication bands and in-phase (0°) difference connection for MB/HB RF communication bands at respective reference points of two of antennas 137*a*-137*h*.

Figure 4B:
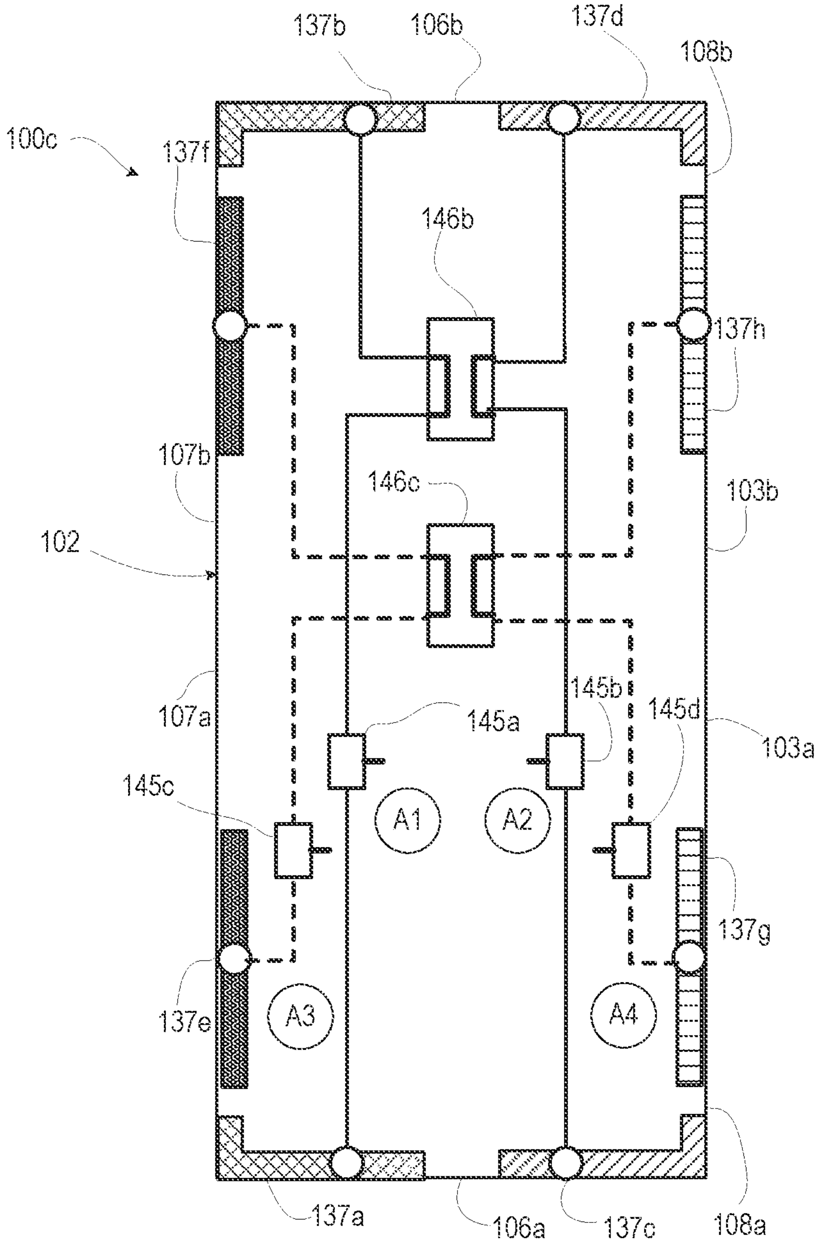
FIG. 4B depicts a different front view of the example communication device of FIG. 4A having the four antenna feed/source networks switched, according to one or more embodiments.

FIG. 4B depicts a front diagram of example communication device 100*c* with first, second, third, and fourth antenna feed/source networks 145*a*-145*d* switched Each of first, second, third, and fourth antenna feed/source networks 145*a*-145*d* (FIG. 4A) configures the respective pair of antennas 137*a*-137*h* to operate as one antenna, providing four RF transceiver chain capability for communication device 100*c*. As an example, each antenna feed/source network 145*a*-145*d* provides a zero phase difference ("in-phase") to transceived signals at affected RF communication bands of ultra-low band (ULB) and low band (LB) between communicatively connected antennas 137*a*-137*h* to mitigate cancellations between the proximate antennas 137*a*-137*h*. RF communication bands, such mid-band (MB) and high band (HB), that are not significantly affected by proximity can be maintained in-phase with zero degree phase difference. In one or more embodiments, the potential negative effects of antenna proximity are mitigated by open circuiting, short circuiting to ground, and/or connecting a reactive load to one of the antennas 137*a*-137*h* that has a paired antenna in close proximity when the housing assembly is in the closed position.

Figure 4C:
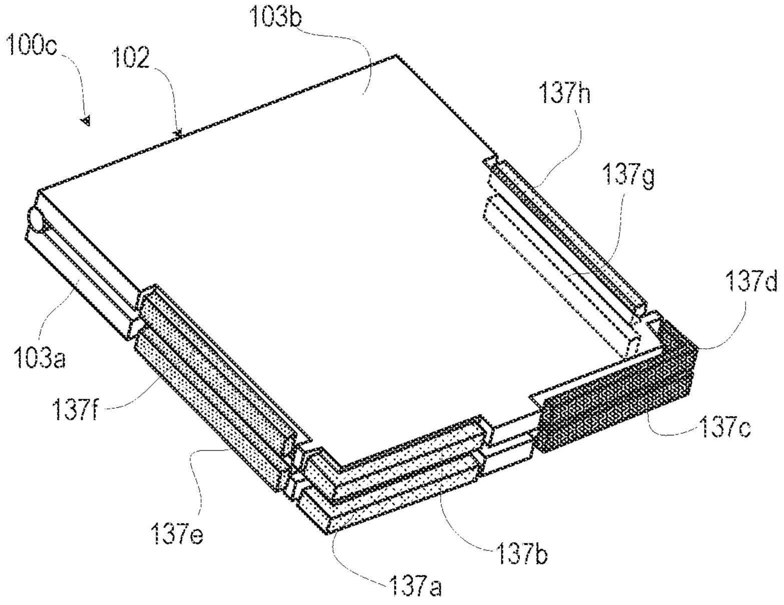
FIG. 4C depicts a three-dimensional view of the example communication device of FIG. 4A with the housing assembly is in the closed position, according to one or more embodiments.

FIG. 4C depicts a three-dimensional view of example communication device 100*c* while housing assembly 102 is in the closed position. The two antennas in each of the different pairs of antennas 137*a*-137*h* are too close to each other for independent communication. Also, while housing assembly 102 is in the closed position, first and second antennas 137*a*-137*b* are proximate to and substantially aligned with each other. Fourth antenna 137*d* is available for being used separately. In response to housing assembly 102 is in the closed position, first antenna feed/source network 145*a* is switched by first antenna switches 146*b*-146*c* as depicted in FIG. 4B.

Figure 5:
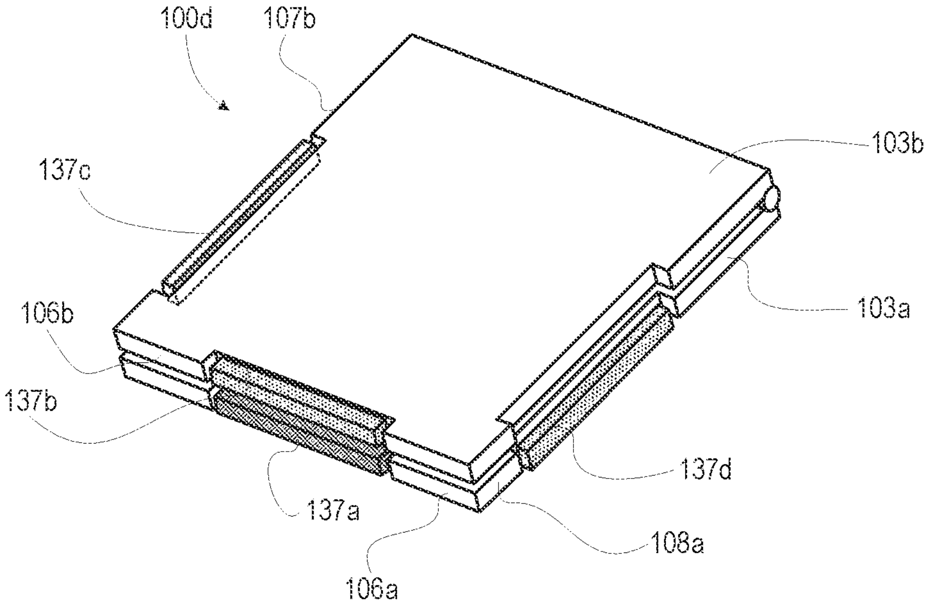
FIG. 5 depicts a three-dimensional view of an example communication device having four antennas supported by a housing assembly that is in a closed position, according to one or more embodiments.

FIG. 5 depicts a three-dimensional view of example communication device 100*d* having antenna 137*a*-137*d* supported by housing assembly 102 that is in a closed position. Communication device 100*d* can have similar or identical components and functionality of communication device 100 (FIG. 1). First antenna 137*a* is positioned on distal side 106*a* of first housing portion 103*a*. Second antenna 137*b* is positioned on distal side 106*b* of second housing portion 103*b*. Third antenna 137*c* is positioned at a first lateral side 107*b* of second housing portion 103*b*. Fourth antenna 137*d* is positioned at second lateral side 108*a* of first housing portion 103*a*. While housing assembly 102 is in the closed position, first and second antennas 137*a*-137*b* are proximate and substantially aligned in parallel ("co-located"). Combined radiation efficiency is additive for co-located antennas 137*a*-137*b* that are driven with in-phase signals. Combined radiation efficiency is subtractive (canceled) for co-located antennas 137*a*-137*b* that are driven with off-phase signals.

Figure 6:
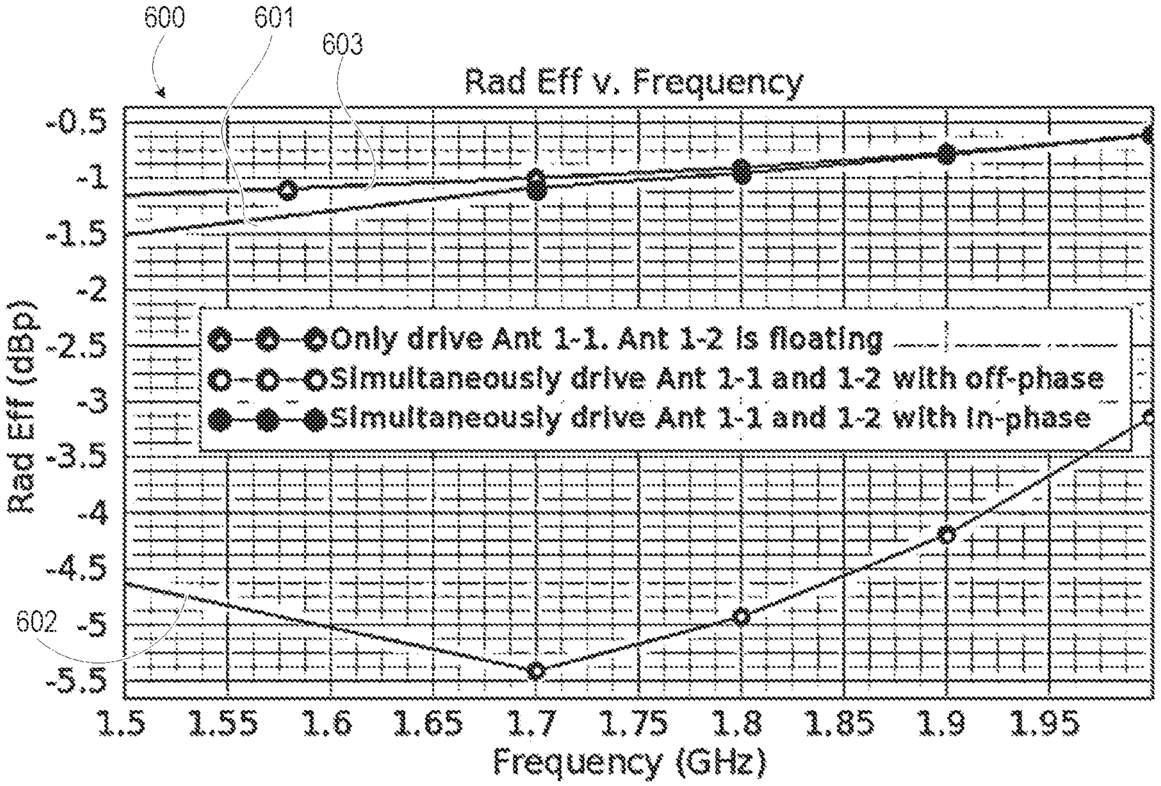
FIG. 6 is a graphical plot of radiation efficiency versus frequency for three antenna feed/source network configurations between two proximate antennas that are in a substantially parallel alignment, according to one or more embodiments.

FIG. 6 is a graphical plot 600 of radiation efficiency versus frequency for three antenna feed/source network configurations between two antennas that are proximate to and substantially aligned in parallel with each other, such as depicted by communication device 100*d* of FIG. 5. First trace 601 is plot of radiation efficiency versus frequency for driving only one of antennas 137*a*-137*b* (FIG. 5) with the other one of antennas 137*a*-137*b* floating (i.e., electrically disconnected). Second trace 602 is a plot of radiation efficiency versus frequency for simultaneously driving antenna 137*a* (FIG. 5) in-phase and driving antenna 137*b* off-phase with about 4 dB in cancellation resulting, as compared to first trace 601. Third trace 603 is a plot of radiation efficiency versus frequency for driving both antennas 137*a*-137*b* (FIG. 5) in-phase, resulting in about 0.4 dB higher efficiency at 1.5 GHz and about the same efficiency about 1.7 GHz, as compared to first trace 601.

Figure 7A:
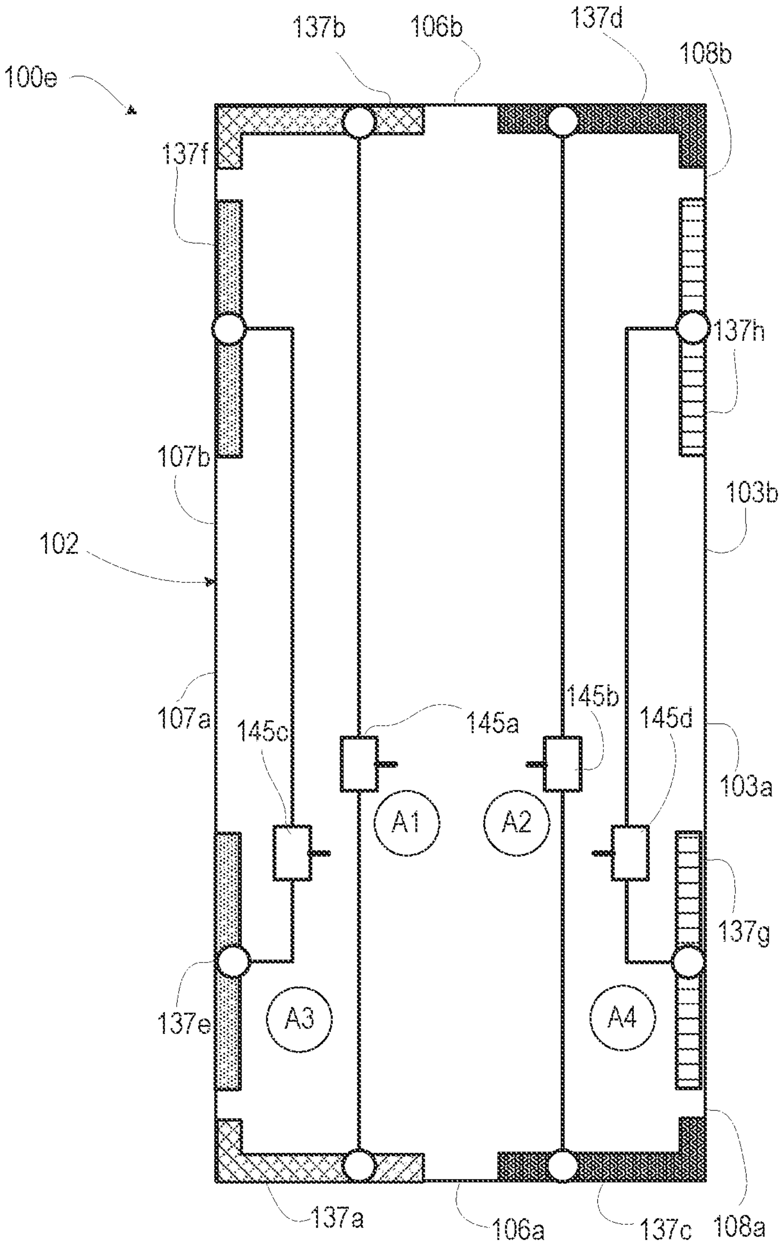
FIG. 7A depicts a front view of an example communication device having a housing assembly that is in the open position and with four antenna feed/source networks that change a phase between a respective pair of antennas in response to the housing assembly being in the open position, according to one or more embodiments.

FIG. 7A depicts a front diagram of example communication device 100*e* with four antenna feed/source networks that change phase between a respective pair of antennas in response to housing assembly 102 being in the open position. Communication device 100*e* can have similar or identical components and functionality of communication device 100 (FIG. 1). Antennas 137*a*-137*h* are positioned identically or similarly as described above for communication device 100*b* (FIGS. 3A-3B). First antenna feed/source network 145*a* is communicatively connected to first and second antennas 137*a*-137*b*. Second antenna feed/source network 145*b* is communicatively connected to third and fourth antennas 137*c*-137*d*. Third antenna feed/source network 145*c* is communicatively connected to fifth and sixth antennas 137*e*-137*f*. Fourth antenna feed/source network 145*d* is communicatively connected to seventh and eighth antennas 137*g*-137*h*. First, second, third, and fourth antenna feed/source networks 145*a*-145*d* create an off-phase (180°) difference at ULB/LB RF communication bands and in-phase (0°) difference connection for MB/HB RF communication bands at respective reference points of two of the antennas 137*a*-137*h*.

Figure 7B:
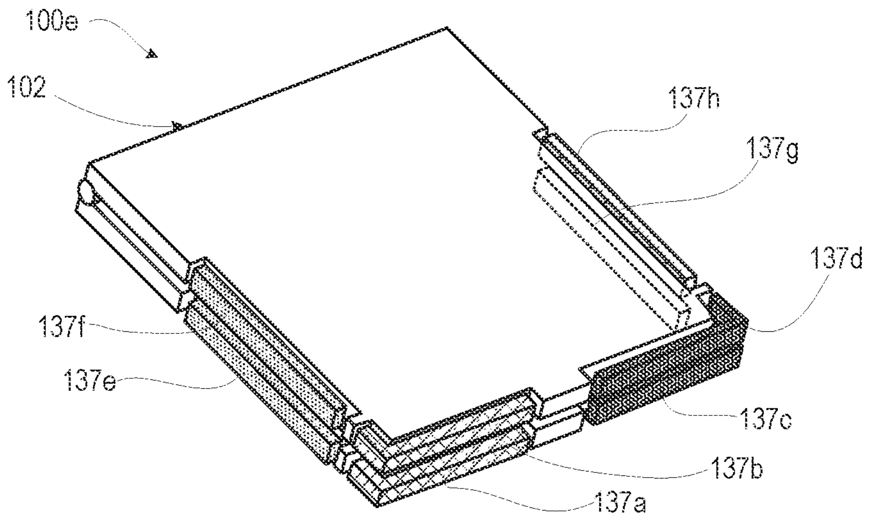
FIG. 7B depicts a three-dimensional view of the example communication device of FIG. 7A with the housing assembly in the closed position, according to one or more embodiments.

FIG. 7B depicts a three-dimensional view of example communication device 100*e* while housing assembly 102 is in the closed position. First and second antennas 137*a*-137*b* are co-located. Third and fourth antennas 137*c*-137*d* are co-located. Fifth and sixth antennas 137*e*-137*f* are co-located. Seventh and eighth antennas 137*g*-137*h* are co-located. In one or more embodiments, phases at reference points of each pair of co-located antennas 137*a*-137*h* are maintained in-phase for all RF communication bands. In one or more embodiments, one of co-located antennas 137*a*-137*h* are open circuited, short circuited to ground, or electrically connected to a reactive load. The respective antenna feed/source network 145*a*-145*d* (FIG. 7A) redistributes all of the power to the active antenna of the two co-located antennas 137*a*-137*h*.

Figure 8:
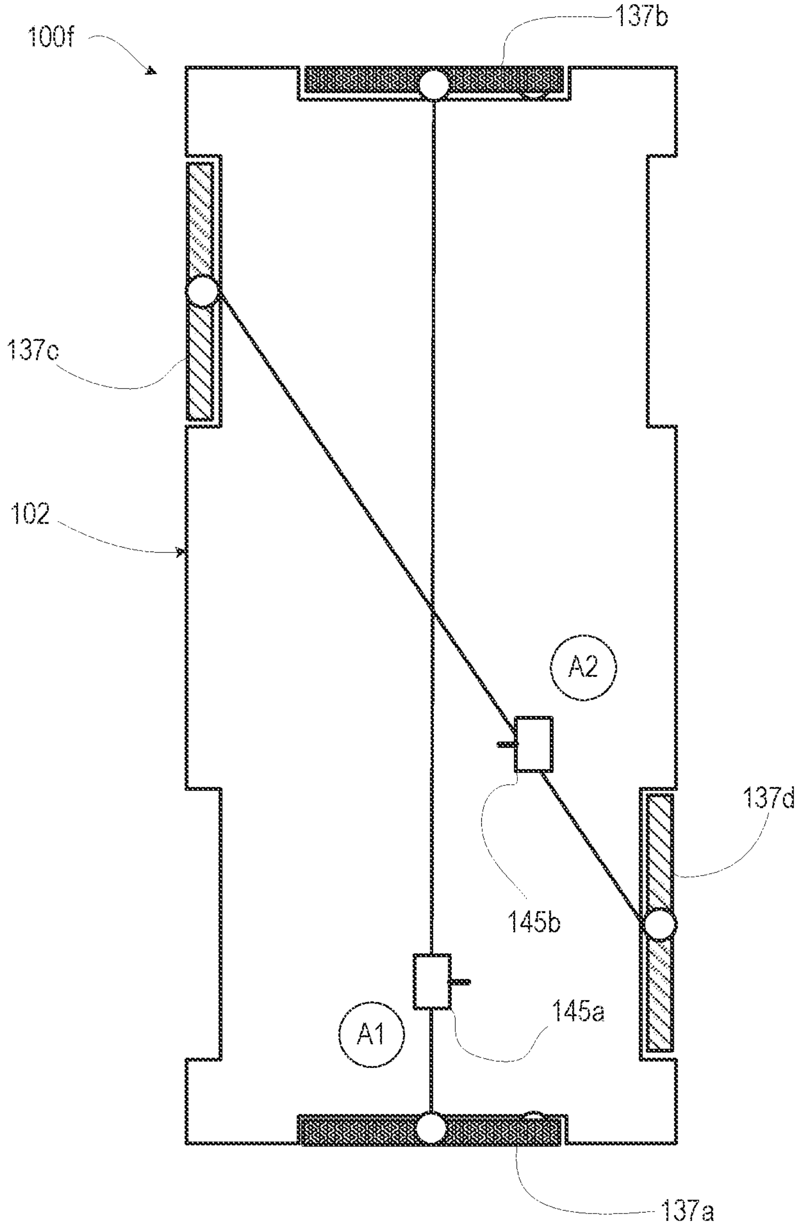
FIG. 8 depicts a front diagram of an example communication device having a housing assembly that is in the open position and with one of two antenna feed/source networks that change a phase between a respective pair of antennas in response to the housing assembly being in the open position, according to one or more embodiments.

FIG. 8 depicts a front diagram of example communication device 100*f* with one of two antenna feed/source networks that change a phase between a respective pair of antennas in response to the housing assembly 102 being in the open position. Communication device 100*f* can have similar or identical components and functionality of communication device 100 (FIG. 1). First, second, third, and fourth antennas 137*a*-137*d* are positioned identically or similarly to communication device 100*d* (FIG. 5). First antenna feed/source network 145*a* is communicatively connected to first and second antennas 137*a*-137*b* ("inline antenna array architecture"). First antenna feed/source network 145*a* operates as described above for communication device 100*e* (FIG. 7A), which was also configured with an in-line antenna array architecture. Second antenna feed/source network 145*b* is communicatively connected to third and fourth antennas 137*c*-137*d* (providing a "diagonal antenna array architecture"). In the closed position, third and fourth antennas 137*c*-137*d* are not co-located. While housing assembly 102 is both in the open position and the closed position, second antenna feed/source network 145*b* creates an off-phase (180°) difference at ULB/LB RF communication bands and in-phase (0°) difference connection for MB/RB RF communication bands at respective reference points of antennas 137*c*-137*d*.

Figure 9A:
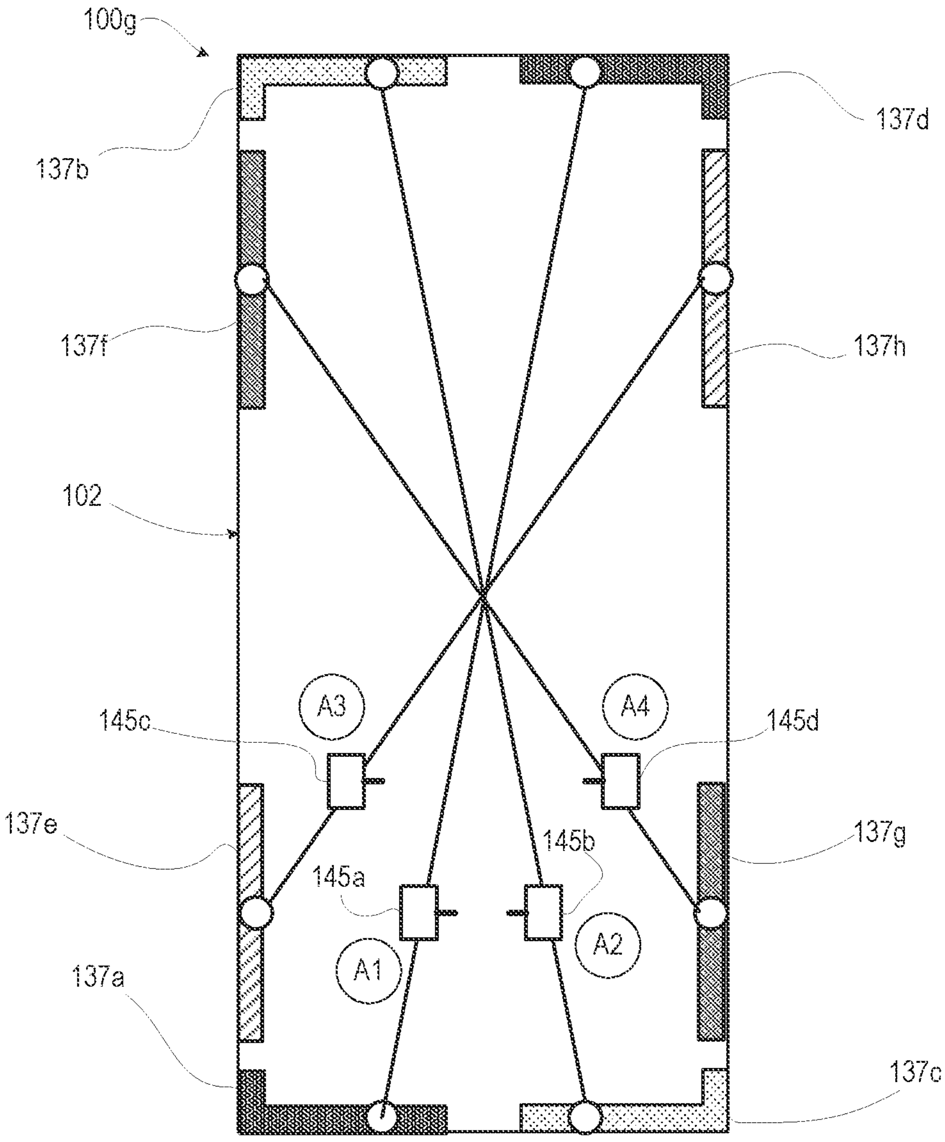
FIG. 9A depicts a front diagram of an example communication device with four antenna feed/source networks that change an active/inactive status of a respective pair of antenna elements in response to the housing assembly being in the open position, according to one or more embodiments.

FIG. 9A depicts a front diagram of example communication device 100*g* with four antenna feed/source networks that change phase between a respective pair of antennas in response to the housing assembly 102 being in the open position. Communication device 100*g* can have similar or identical components and functionality of communication device 100 (FIG. 1). Antennas 137*a*-137*h* are positioned identically or similarly as described above for communication device 100*b* (FIGS. 3A-3B). First antenna feed/source network 145*a* is communicatively connected to first and fourth antennas 137*a*, 137*d*. Second antenna feed/source network 145*b* is communicatively connected to second and third antennas 137*b*, 137*c*. Third antenna feed/source network 145*c* is communicatively connected to fifth and eighth antennas 137*e*, 137*h*. Fourth antenna feed/source network 145*d* is communicatively connected to sixth and seventh antennas 137*f*, 137*g*. While the housing assembly 102 is in the open position, antenna feed/source networks 145*a*-145*d* create relative feed phases at the communicatively-connected pair of antennas 137*a*-137*h* at specific values for best performance. As an example, first, second, third, and fourth antenna feed/source networks 145*a*-145*d* create an off-phase (180°) difference at ULB/LB RF communication bands and in-phase (0°) difference connection for MB/HB RF communication bands at respective reference points of two of the antennas 137*a*-137*h*.

Figure 9B:
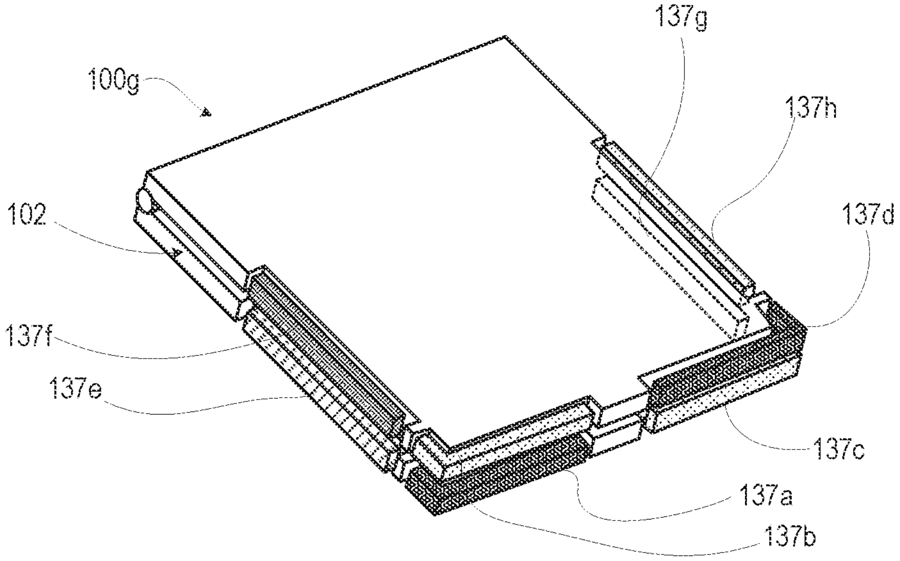
FIG. 9B depicts a three-dimensional view of the example communication device of FIG. 9A with the housing assembly in the closed position, according to one or more embodiments.

FIG. 9B depicts a three-dimensional view of example communication device 100*g* while housing assembly 102 is in the closed position. First, second, third, and fourth antenna feed/source networks 145*a*-145*d* deactivate one antenna 137*a*-137*h* of each pair of co-located antennas 137*a*-137*h*. As an example, deactivation can include open circuiting, short circuiting to ground, or electrically connecting a reactive load. First, second, third, and fourth antenna feed/source networks 145*a*-145*d* (FIG. 9A) distribute all of the power to the one of co-located antennas 137*a*-137*h* that is active.

Figure 10:
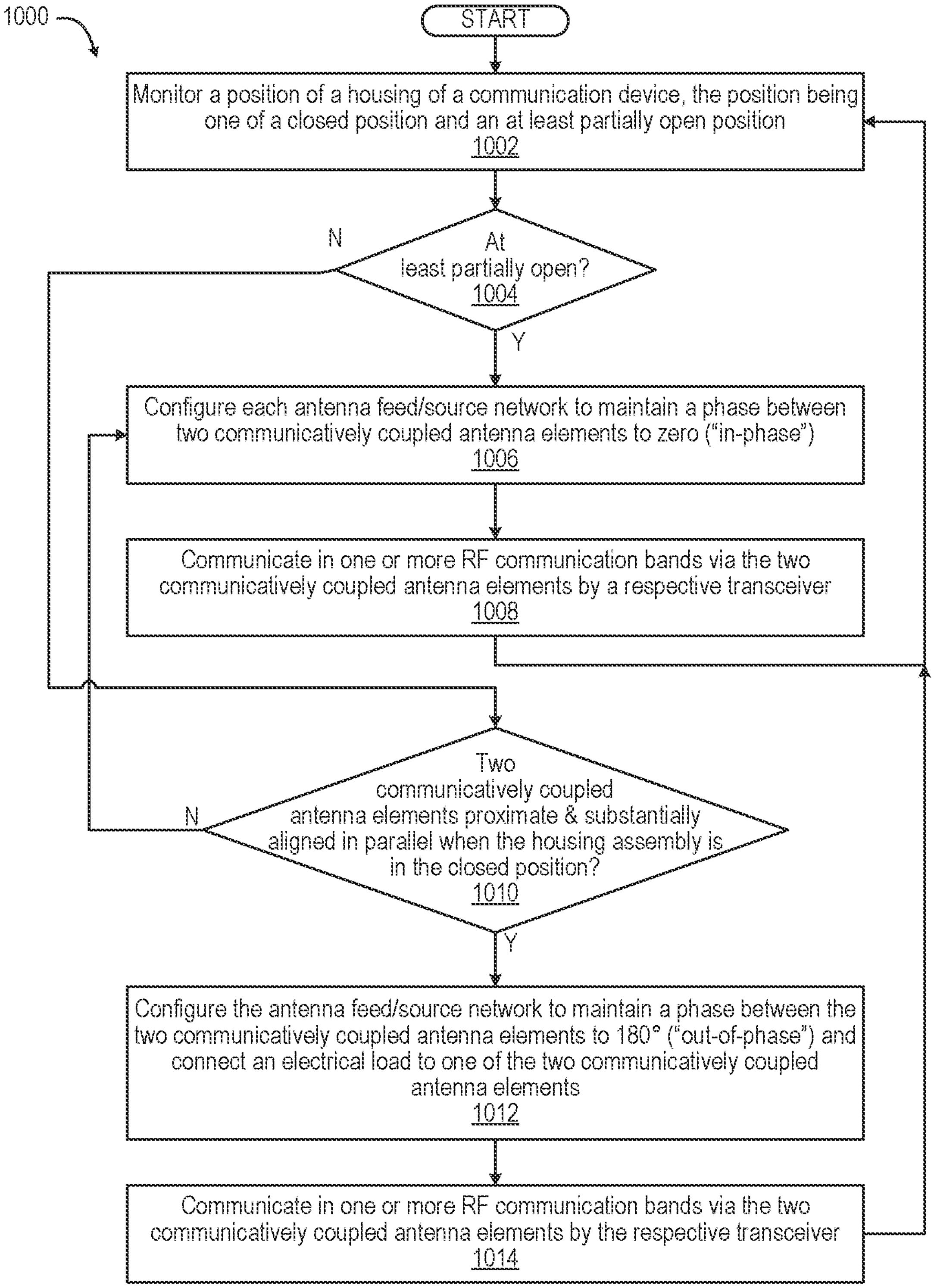
FIG. 10 presents a flow diagram of a method for enabling multiple transceiver communication in a communication device having multiple antennas arranged within a configurable housing assembly, according to one or more embodiments.

FIG. 10 presents a flow diagram of a method for enabling multiple transceiver communication in a communication device having a plurality of antennas arrange in a configurable housing assembly. The description of method 1000 is provided with general reference to the specific components illustrated within the preceding FIGS. 1, 2A-2C, 3A-3B, 4A-4C, 5, 6, 7A-7B, 8, and 9A-9B. In at least one embodiment, communication device 100, managed by controller 101, performs method 1000 by dynamically configuring RF front end 124 using antenna feed/source networks in response to a housing assembly position detected by housing position sensor 109 (FIG. 1). Controller 101 executes antenna control application 115 (FIG. 1) to provide the multiple transceiver communication functionality of method 1000. Specific components described in method 1000 can be identical or similar to components of the same name used to describe preceding FIGS. 1, 2A-2C, 3A-3B, 4A-4C, 5, 6, 7A-7B, 8, and 9A-9B. Following the start block, method 1000 includes monitoring, via the housing position sensor a position of a housing assembly of a communication device, the position being one of a closed position and an at least partially open position (block 1002). Method 1000 includes determining whether the housing assembly is in the at least partially open position (decision block 1004). In response to determining that the housing assembly is in the at least partially open position, method 1000 includes configuring each antenna feed/source network to adjust a phase between two communicatively coupled antenna elements to zero ("in-phase") (block 1006). Method 1000 includes communicating in one or more RF communication bands via the two communicatively coupled antenna elements by a respective transceiver (block 1008). Then method 1000 returns to block 1002.

In response to determining that the housing assembly is not in the at least partially open position, method 1000 includes determining, in decision block 1010, whether the two communicatively coupled antenna elements are identified as being proximate to each other and substantially aligned in parallel when the housing assembly is in the closed position. In response to determining that the two communicatively coupled antenna elements are not identified as being proximate to each other and substantially aligned in parallel when the housing assembly is in the closed position, method 1000 returns to block 1006. In response to determining that the two communicatively coupled antenna elements are identified as being proximate to each other and substantially aligned in parallel when the housing assembly is in the closed position, method 1000 includes configuring the antenna feed/source network to adjust a phase between the two communicatively coupled antenna elements to 180° ("out-of-phase") and connecting an electrical load to one of the two communicatively coupled antenna elements (block 1012). Method 1000 includes communicating in one or more RF communication bands via the other one of the two communicatively coupled antenna elements by the respective transceiver (block 1014). Then method 1000 returns to block 1002.

Figure 11A:
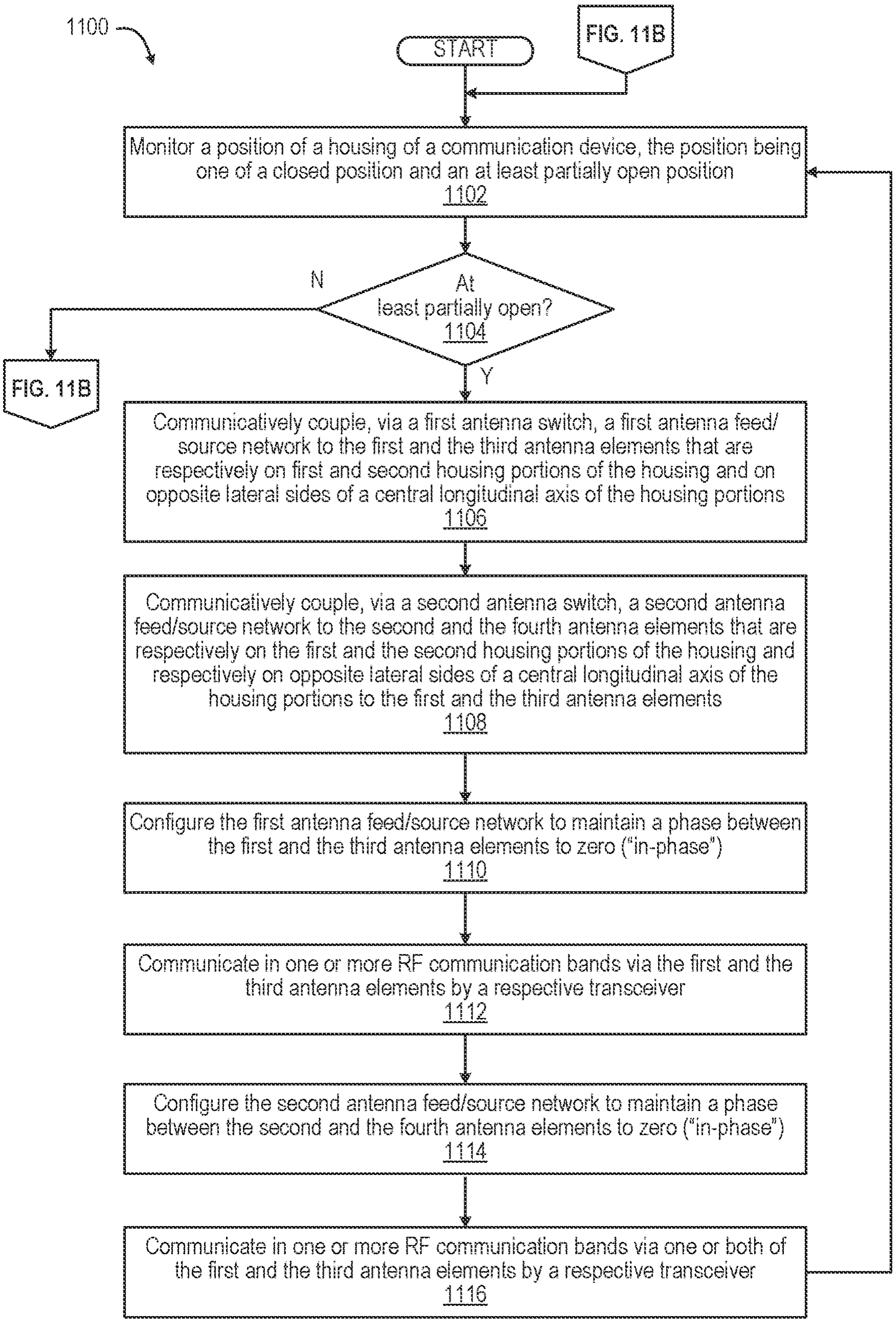
FIGS. 11A-11B (FIG. 11) present a flow diagram of a method for enabling multiple transceiver communication with increased spatial diversity in a communication device while a configurable housing assembly is in an open position, according to one or more embodiments.
Figure 11B:
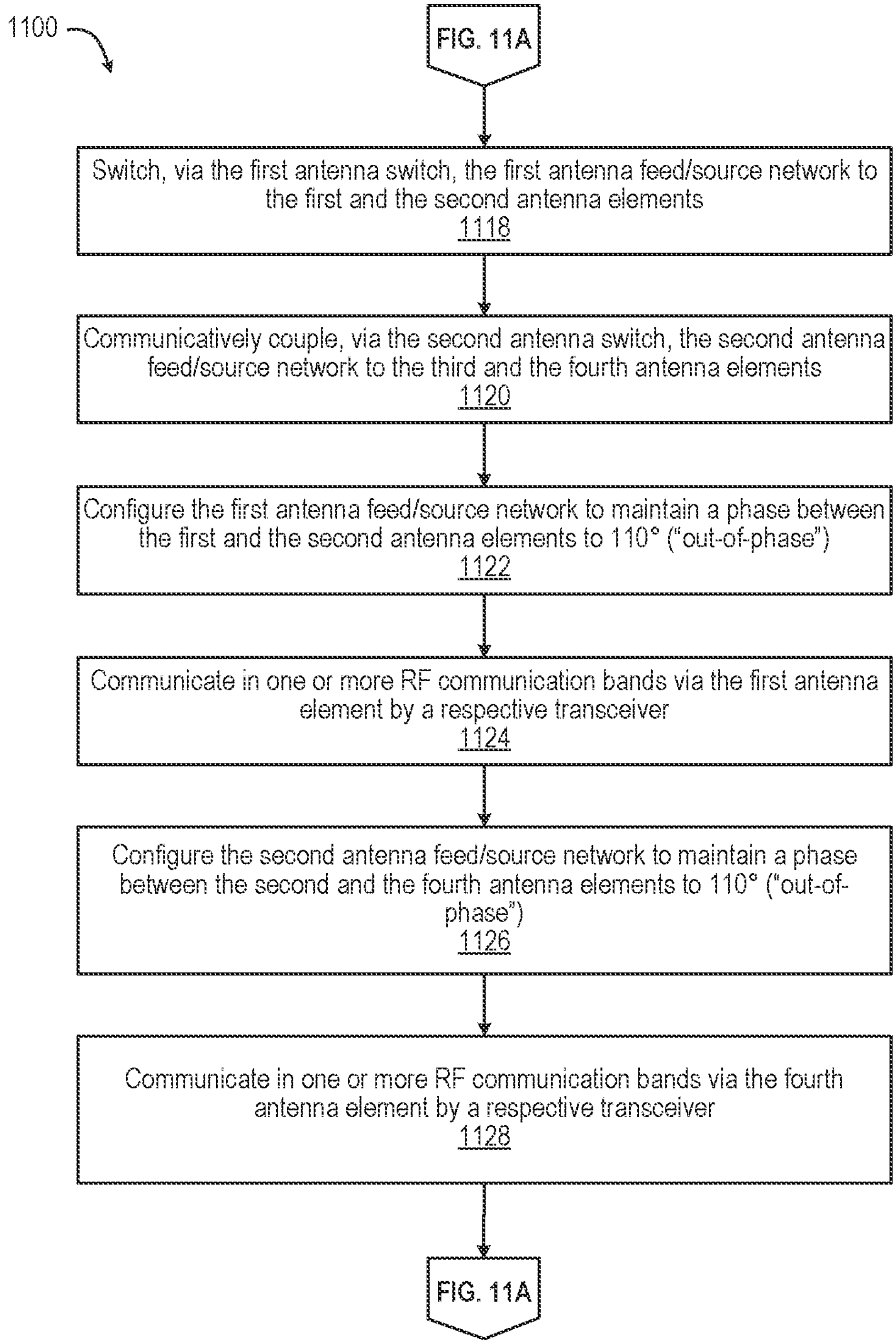

FIGS. 11A-11B (FIG. 11) present a flow diagram of a method for enabling multiple transceiver communication with increased spatial diversity in a communication device while a configurable housing assembly is in an open position. The description of method 1100 is provided with general reference to the specific components illustrated within the preceding FIGS. 1, 2A-2C, 3A-3B, 4A-4C, 5, 6, 7A-7B, 8, 9A-9B, and 10. In at least one embodiment, communication device 100, managed by controller 101, performs method 1000 by dynamically configuring RF front end 124 using antenna feed/source networks in response to housing position sensor 109 (FIG. 1). Controller 101 executes antenna control application 115 (FIG. 1) to provide the multiple transceiver communication functionality of method 1000. Specific components described in method 1000 can be identical or similar to components of the same name used to describe preceding FIGS. 1, 2A-2C, 3A-3B, 4A-4C, 5, 6, 7A-7B, 8, 9A-9B, and 10.

With reference to FIG. 11A, method 1100 includes monitoring a position of a housing assembly of a communication device, the position being one of a closed position and an at least partially open position (block 1102). First, second, third, and fourth antenna elements are supported by the housing assembly. Method 1100 includes determining whether the housing assembly is in the at least partially open position (decision block 1104). In response to determining that the housing assembly is in the at least partially open position, method 1100 includes communicatively coupling, via a first antenna switch, a first antenna feed/source network to the first and the third antenna elements that are respectively on first and second housing portions of the housing assembly and on opposite lateral sides of a central longitudinal axis of the housing portions (block 1106). Method 1100 includes communicatively coupling, via a second antenna switch, a second antenna feed/source network to the second and the fourth antenna elements that are respectively on the first and the second housing portions of the housing assembly and respectively on opposite lateral sides of a central longitudinal axis of the housing portions to the first and the third antenna elements (block 1108). Method 1100 includes configuring the first antenna feed/source network to adjust a phase between the first and the third antenna elements to zero ("in-phase") (block 1110). Method 1100 includes communicating in one or more RF communication bands via one or both of the first and the third antenna elements by a respective transceiver (block 1112). Method 1100 includes configuring the second antenna feed/source network to adjust a phase between the second and the fourth antenna elements to zero ("in-phase") (block 1114). Method 1100 includes communicating in one or more RF communication bands via the first and the third antenna elements by a respective transceiver (block 1116). Then method 1100 returns to block 1102.

In response to determining that the housing assembly is not in the at least partially open position (i.e., closed position), method 1100 includes communicatively coupling, via the first antenna switch, the first antenna feed/source network to the first and the second antenna elements (block 1118). Method 1100 includes communicatively coupling, via the second antenna switch, the second antenna feed/source network to the third and the fourth antenna elements (block 1120). Method 1100 includes configuring the first antenna feed/source network to adjust a phase between the first and the second antenna elements to 180° ("out-of-phase") (block 1122). Method 1100 includes communicating in one or more RF communication bands via the first antenna element by a respective transceiver (block 1124). Method 1100 includes configuring the second antenna feed/source network to adjust a phase between the second and the fourth antenna elements to 180° ("out-of-phase") (block 1126). Method 1100 includes communicating in one or more RF communication bands via the fourth antenna element by a respective transceiver (block 1128). Then method 1100 returns to block 1102.

For clarity, method 1100 (FIGS. 11A-11B) includes adjusting phase by a particular antenna feed/source network that remains coupled to at least two antenna elements while the housing assembly is in the closed position and in the at least partially open position. Certain pairs of antenna elements can remain separate while the housing assembly is in both the closed position and in the at least partially open position. Certain pairs of antenna elements can become proximate and substantially aligned in parallel while the housing assembly is in the at least partially open position. Method 1100 (FIGS. 11A-11B) includes switching antennas for antenna diversity between four antenna elements. Communication devices 100 can include various combinations of two or more antenna elements that have phases adjusted, phases not adjusted, and/or are switched pairings based on position of a configurable housing assembly.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:

a housing assembly having first and second housing portions connected at respective proximal sides for relative movement between an open position and a closed position about a lateral axis;

a housing position sensor that detects when housing assembly is in the closed position and the open position;

a first antenna array comprised of first and second antenna elements each having an elongated shape and configured to communicate in one or more radio frequency (RF) communication bands, the first and the second antenna elements supported respectively by the first and the second housing portions, the first antenna element proximate to and substantially aligned in parallel with the second antenna element when the housing assembly is in the closed position and separated from the second antenna element when the housing assembly is in the open position;

a first antenna feed/source network communicatively coupled to the first and the second antenna elements and configured to eliminate array cancellations between the first and the second antenna elements when the housing assembly is in the closed position, the first antenna feed/source network transmitting and receiving via one or a combination of the first antenna element and the second antenna element, the first antenna feed/source network capable of adjusting a phase between the first and second antenna elements, and the first antenna feed/source network eliminates array cancellations while the housing assembly is in the closed position by adjusting a phase difference of the first antenna array between 0 and 180 degrees; and a controller communicatively coupled to the housing position sensor and to a radio frequency (RF) front end comprising the first antenna feed/source network, wherein the controller:

determines, from housing position signal received from the housing position sensor, whether the housing assembly is in the closed position or in the at least partially open position; and in response to housing assembly being in the closed position, where the first and second antenna elements are proximate to each other and substantially aligned in parallel, configuring the antenna feed/source network to adjust a phase between the first antenna element and the second antenna element to an 180° "out-of-phase" relationship.

2. The communication device of claim 1, wherein further the first antenna feed/source network eliminates array cancellations in the closed position by connecting a reactive load to one of the first and the second antenna elements.

3. The communication device of claim 1, further comprising:

a third antenna element supported by the second housing portion; and a first antenna switch having an input communicatively coupled to the first antenna feed/source network and having an output that is communicatively coupled to the third antenna element when the housing assembly is in the open position for transmission and spatial diversity and which is communicatively coupled to the second antenna element when the housing assembly is in the closed position, enabling the third antenna element to communicate separately from the first and the second antenna elements while the housing assembly is in both the open and the closed position.

4. The communication device of claim 3, further comprising:

a second antenna array comprised of the third antenna element and a fourth antenna element each having an elongated shape and configured to communicate in one or more RF communication bands, the third and the fourth antenna elements supported respectively by the second and the first housing portions, the third antenna element proximate to and substantially aligned in parallel with the second antenna element when the housing assembly is in the closed position and separated from the second antenna element when the housing assembly is in the open position, the third and the fourth antenna elements of the second antenna array being longitudinally positioned respectively at distal sides of the first and the second housing portions, opposite to the proximal side, and laterally positioned in a second lateral direction from a central longitudinal axis of the housing assembly; and a second antenna feed/source network communicatively coupled to the fourth antenna element.

5. The communication device of claim 4, further comprising:

a third antenna array having fifth and sixth antenna elements each having an elongated shape and supported respectively by a first lateral side of the first and the second housing portions, the fifth antenna element proximate to and substantially aligned in parallel with the sixth antenna element when the housing assembly is in the closed position and not proximately with the sixth antenna element when the housing assembly is in the open position;

a fourth antenna array having seventh and eighth antenna elements, each having an elongated shape and supported respectively by a second lateral side of the first and the second housing portions, the seventh antenna element proximate to and substantially aligned with the eighth antenna element when the housing assembly is in the closed position and not proximately with the eighth antenna element when the housing assembly is in the open position;

a third, and a fourth antenna feed/source network, the third antenna feed/source network communicatively coupled to the fifth antenna element, the fourth antenna feed/source network communicatively coupled to the seventh antenna element;

a second antenna switch having a dual pole, dual throw configuration, a first pole of the second antenna switch communicatively coupled to the fourth antenna feed/source network, a second pole of the second antenna switch communicatively coupled to the third antenna feed/source network, a first throw of the second antenna switch communicatively coupled to the sixth antenna element, and a second throw of the second antenna switch communicatively coupled to the eighth antenna element.

6. The communication device of claim 5, wherein:

the first and the second antenna elements of the first antenna array are longitudinally positioned respectively at distal sides, opposite to the proximal side, of the first and the second housing portions and laterally positioned in a first lateral direction from a central longitudinal axis of the housing assembly; and the first antenna switch has a dual pole, dual throw configuration, a first pole of the first antenna switch communicatively coupled to the first antenna feed/source network, a second pole of the first antenna switch communicatively coupled to the second antenna feed/source network, a first throw of the first antenna switch communicatively coupled to the third antenna element, and a second throw of the first antenna switch communicatively coupled to the second antenna element.

7. The communication device of claim 1, wherein:

the first and the second antenna elements are longitudinally positioned with respective elongated shapes in orientations mirrored about the lateral axis respectively on the first and the second housing portions when the housing assembly is in the open position; and the first antenna feed/source network extends longitudinally between the first and the second antenna elements.

8. The communication device of claim 7, wherein:

the first and the second antenna elements of the first antenna array are longitudinally positioned respectively at distal sides of the first and the second housing portions opposite to the proximal side, and laterally positioned in a first lateral direction from a central longitudinal axis of the housing assembly; and the communication device further comprises:

a second antenna array having third and fourth antenna elements each having an elongated shape, supported respectively at the distal sides of the first and the second housing portions and laterally positioned in a second lateral direction from the central longitudinal axis of the housing assembly, the third antenna element proximate to and substantially aligned in parallel with the fourth antenna element when the housing assembly is in the closed position and separated from the fourth antenna element when the housing assembly is in the open position; and a second antenna feed/source network extending longitudinally between the third and the fourth antenna elements and configured to eliminate array cancellations when the housing assembly is in the closed position.

9. The communication device of claim 8, further comprising:

a third antenna array having fifth and sixth antenna elements each having an elongated shape and supported respectively by a first lateral side of the first and the second housing portions, the fifth antenna element proximate to and substantially aligned in parallel with the sixth antenna element when the housing assembly is in the closed position and not proximate with the sixth antenna element when the housing assembly is in the open position;

a third antenna feed/source network extending longitudinally between the fifth and the sixth antenna elements and configured to eliminate array cancellations between the fifth and the sixth antenna elements in the closed position;

a fourth antenna array having seventh and eighth antenna elements, each having an elongated shape and supported respectively at a second lateral side of the first and the second housing portions, the seventh antenna element proximate to and substantially aligned with the eighth antenna element when the housing assembly is in the closed position and not proximate with the eighth antenna element when the housing assembly is in the open position;

a fourth antenna feed/source network extending longitudinally between the seventh and the eighth antenna elements and configured to eliminate array cancellations in the closed position.

10. The communication device of claim 1, wherein:

the first and the second antenna elements of the first antenna array are supported respectively by distal sides, opposite to the proximal side, of the first and the second housing portions; and the communication device further comprises:

a second antenna array having third and fourth antenna elements, each having an elongated shape and supported respectively by a first lateral side of the first housing portion and a second lateral side of the second housing portion; and a second antenna feed/source network extending between the third and the fourth antenna elements and configured to maintain a respective phase of the third and the fourth antenna elements to be substantially in-phase.

11. The communication device of claim 1, wherein:

the first and the second antenna elements of the first antenna array are supported by the distal side, opposite to the proximal side, respectively of the first and the second housing portions and laterally positioned respectively in a first and a second lateral direction from a central longitudinal axis of the housing assembly; and the communication device further comprising:

a second antenna array having third and fourth antenna elements, each having an elongated shape and supported respectively by the distal side, opposite to the proximal side, respectively of the first and the second housing portions and laterally positioned respectively in the second and the first lateral direction from the central longitudinal axis of the housing assembly, the first antenna element proximate to and substantially aligned with the fourth antenna element when the housing assembly is in the closed position and the second antenna element proximate to and substantially aligned with the third antenna element when the housing assembly is in the closed position; and a second antenna feed/source network extending between the third and the fourth antenna elements.

12. The communication device of claim 11, further comprising:

a third antenna array having fifth and sixth antenna elements supported respectively by a first lateral side of the first housing portion and a second lateral side of the second housing portion;

a third antenna feed/source network extending between the fifth and the sixth antenna elements;

a fourth antenna array having seventh and eighth antenna elements supported respectively by a second lateral side of the first housing portion and a first lateral side of the second housing portion, the fifth antenna element proximate to and substantially aligned with the eighth antenna element when the housing assembly is in the closed position and the sixth antenna element proximate to and substantially aligned with the seventh antenna element when the housing assembly is in the closed position; and a fourth antenna feed/source network extending between the seventh and the eighth antenna elements.

13. The communication device of claim 12, wherein each of the first, the second, the third, and the fourth antenna feed/source networks are configured: (i) when the housing assembly is in the open position to adjust phases of respective antenna elements to off-phase in ultra-low band and low band and to in-phase in medium band and high bands; and (ii) when the housing assembly is in the closed position to activate a selected one of: (i) the first and the second antenna elements of the first antenna array; (ii) the third and the fourth antenna elements of the second antenna array; (iii) the fifth and the sixth antenna elements of the third antenna array; and (iv) the seventh and the eight antenna elements of the fourth antenna array.

14. A method comprising:

determining, by a controller, a position of a housing assembly of a communication device, the housing assembly having first and second housing portions connected at proximal ends for relative movement between an open position and a closed position, the first and the second housing portions supporting respectively a first and a second antenna element of a first antenna array, each of the first and the second antenna elements each having an elongated shape, the first antenna element proximate to and substantially aligned in parallel with the second antenna element when the housing assembly is in the closed position and separated from the second antenna element when the housing assembly is in the open position, the first and second antenna elements communicatively coupled to a first antenna feed/source network, the first antenna feed/source network transmitting and receiving via one or a combination of the first antenna element and the second antenna element, the first antenna feed/source network capable of adjusting a phase between the first and second antenna elements, and the first antenna feed/source network eliminating array cancellations while the housing assembly is in the closed position by adjusting a phase difference of the first antenna array between 0 and 180 degrees; and in response to determining that the housing assembly is in an at least partially open position, communicating in one or more radio frequency (RF) communication bands via the at least one of a first and the second antenna element; and in response to determining that the housing assembly is in the closed position:

configuring the first antenna feed/source network to eliminate array cancellations across/between the first and second antenna elements by adjusting, by the first antenna feed/source network, a phase difference of the first antenna array between 0 and 180 degrees; and communicating in the one or more RF communication bands via a selected one of the first and the second antenna elements of the first antenna array.

15. The method of claim 14, wherein:

the communication device further comprises a second antenna array comprised of a third and a fourth antenna element each having an elongated shape, respectively supported by the first and the second housing portions, and which are proximate to each other and aligned in parallel while the housing assembly is in the closed position, the first and the second antenna elements on an opposite lateral side of the housing assembly to the third and fourth antenna elements; and the method further comprising:

in response to determining that the housing assembly is in the closed position:

configuring a second antenna feed/source network to eliminate array cancellations across/between the third and the fourth antenna elements; and communicating in one or more RF communication bands via one antenna element of the second antenna array; and in response to determining that the housing assembly is in the at least partially open position:

configuring the first antenna feed/source network to communicate via the first and the third antenna elements;

configuring the second antenna feed/source network to communicate via the second and the fourth antenna elements; and communicating in one or more RF communication bands respectively via each of the first and the second antenna feed/source networks.

16. The method of claim 14, wherein:

in response to determining that the housing assembly is in the at least partially open position, communicating in one or more RF communication bands via at least one second antenna array of a third and a fourth antenna element, each of the third and the fourth antenna elements having an elongated shape, supported respectively by the first and the second housing portions, and the third antenna element separated from the fourth antenna element when the housing assembly is in the at least partially open position, the third antenna element proximate to and substantially aligned in parallel with the fourth antenna element while the housing assembly is in the closed position; and in response to determining that the housing assembly is in the closed position:

configuring a respective second antenna feed/source network communicatively coupled to the third and the fourth antenna elements to eliminate array cancellations across/between the third and the fourth antenna elements; and communicating in one or more RF communication bands via one of the third and the fourth antenna elements of the second antenna array.

17. The method of claim 14, further comprising:

communicating via the first and the second antenna elements of the first antenna array that are supported by the distal side, respectively opposite to the proximal side, of the first and the second housing portions;

communicating in one or more RF bands via a second antenna array having third and fourth antenna elements, each having an elongated shape and supported respectively by a first lateral side of the first housing portion and a second lateral side of the second housing portion; and maintaining, by a second antenna feed/source network extending between the third and the fourth antenna elements, a respective phase of the third and the fourth antenna elements to be substantially in-phase.

18. The method of claim 14, further comprising:

in response to determining that the housing assembly is in the at least partially open position:

communicating via the first and the second antenna elements of the first antenna array that are supported respectively by the distal side, opposite to the proximal side, respectively of the first and the second housing portions and laterally positioned respectively in a first and a second lateral direction from a central longitudinal axis of the housing assembly; and communicating in one or more RF bands via a second antenna array that has a third and a fourth antenna element supported by the distal side respectively of the first and the second housing portions and laterally positioned respectively in the second and the first lateral direction from the central longitudinal axis of the housing assembly;

communicating in one or more RF bands via a third antenna array that has a fifth and a sixth antenna element supported by the second and the first distal side respectively of the first and the second housing portions; and communicating in one or more RF bands via a fourth antenna array that has a seventh and an eighth antenna element respectively supported by the first and the second distal side respectively of the first and the second housing portions; and in response to determining that the housing assembly is in the closed position, configuring respective antenna feed/source networks to eliminate array cancellations caused respectively by the second, the fourth, the sixth, and the eighth antenna elements.

19. A computer program product comprising:

a computer readable storage device; and program code on the computer readable storage device that when executed by a processor associated with a device, the program code enables the communication device to provide the functionality of:

determining a position of a housing assembly of a communication device, the housing assembly having first and second housing portions connected at proximal ends for relative movement between an open position and a closed position, the first and the second housing portions supporting respectively a first and a second antenna element of a first antenna array, each of the first and the second antenna elements each having an elongated shape, the first antenna element proximate to and substantially aligned in parallel with the second antenna element when the housing assembly is in the closed position and separated from the second antenna element when the housing assembly is in the open position, the first and second antenna elements communicatively coupled to a first antenna feed/source network, the first antenna feed/source network transmitting and receiving via one or a combination of the first antenna element and the second antenna element, the first antenna feed/source network capable of adjusting a phase between the first and second antenna elements, and the first antenna feed/source network eliminating array cancellations while the housing assembly is in the closed position by adjusting a phase difference of the first antenna array between 0 and 180 degrees;

in response to determining that the housing assembly is in an at least partially open position, communicating in one or more radio frequency (RF) communication bands via the at least one of a first and the second antenna element; and in response to determining that the housing assembly is in the closed position:

configuring the first antenna feed/source network to eliminate array cancellations across/between the first and second antenna elements; and communicating in the one or more RF communication bands via a selected one of the first and the second antenna elements of the first antenna array.

20. The computer program product of claim 19, wherein the program code enables the communication device to provide the functionality of:

configuring the first antenna feed/source network to eliminate array cancellations in the closed position by adjusting, by the first antenna feed/source network, a phase different of the first antenna array between 0 and 180 degrees.

* * * * *